United States Patent
Miyamoto et al.

(10) Patent No.: US 10,316,779 B2
(45) Date of Patent: Jun. 11, 2019

(54) ABNORMALITY DIAGNOSIS SYSTEM OF AIR-FUEL RATIO SENSOR

(71) Applicant: TOYOTA JIDOSHA KABUSHIKI KAISHA, Toyota-shi, Aichi (JP)

(72) Inventors: Hiroshi Miyamoto, Shizuoka (JP); Toru Kidokoro, Hadano (JP); Yasushi Iwazaki, Ebina (JP); Kenji Suzuki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 55 days.

(21) Appl. No.: 15/026,015

(22) PCT Filed: Sep. 30, 2014

(86) PCT No.: PCT/JP2014/076644
§ 371 (c)(1),
(2) Date: Mar. 30, 2016

(87) PCT Pub. No.: WO2015/050267
PCT Pub. Date: Apr. 9, 2015

(65) Prior Publication Data
US 2016/0281622 A1 Sep. 29, 2016

(30) Foreign Application Priority Data

Oct. 1, 2013 (JP) .................. 2013-206620

(51) Int. Cl.
*F01N 3/00* (2006.01)
*F02D 41/14* (2006.01)
(Continued)

(52) U.S. Cl.
CPC ....... *F02D 41/1475* (2013.01); *F01N 3/2066* (2013.01); *F02D 41/1441* (2013.01);
(Continued)

(58) Field of Classification Search
CPC .............. F01N 3/2066; F02D 41/1441; F02D 41/1454; F02D 41/1475; F02D 41/222; Y02T 10/40
(Continued)

(56) References Cited

U.S. PATENT DOCUMENTS

| 4,739,614 A | 4/1988 | Katsuno et al. |
| 5,357,791 A | 10/1994 | Gee et al. |

(Continued)

FOREIGN PATENT DOCUMENTS

| JP | H04-365952 A | 12/1992 |
| JP | 05-272384 A | 10/1993 |

(Continued)

OTHER PUBLICATIONS

Final Office Action for U.S. Appl. No. 15/026,099 dated May 18, 2018. 29 pp.

(Continued)

*Primary Examiner* — Phutthiwat Wongwian
*Assistant Examiner* — Diem Tran
(74) *Attorney, Agent, or Firm* — Hunton Andrews Kurth LLP

(57) ABSTRACT

An abnormality diagnosis system of an air-fuel ratio sensor is provided with an exhaust purification catalyst, an upstream side air-fuel ratio sensor which is provided at an upstream side of the exhaust purification catalyst, a downstream side air-fuel ratio sensor which is provided at a downstream side of the exhaust purification catalyst, and a diagnosis device which uses the outputs of these air-fuel ratio sensors as the basis to diagnose abnormality of the downstream side air-fuel ratio sensor.

13 Claims, 17 Drawing Sheets

(51) Int. Cl.
*F02D 41/22* (2006.01)
*F01N 3/20* (2006.01)

(52) U.S. Cl.
CPC ..... *F02D 41/1454* (2013.01); *F02D 41/1495* (2013.01); *F02D 41/222* (2013.01); *Y02T 10/40* (2013.01)

(58) Field of Classification Search
USPC .......................................... 60/274, 285, 299
See application file for complete search history.

(56) References Cited

U.S. PATENT DOCUMENTS

| | | | |
|---|---|---|---|
| 5,781,878 | A | 7/1998 | Mizoguchi et al. |
| 5,845,489 | A * | 12/1998 | Dohta ................... F01N 11/00 123/688 |
| 5,852,228 | A | 12/1998 | Yamashita et al. |
| 5,927,260 | A | 7/1999 | Kishimoto et al. |
| 6,032,659 | A | 3/2000 | Yamashita et al. |
| 6,073,440 | A | 6/2000 | Douta et al. |
| 6,344,118 | B1 | 2/2002 | Kobayashi et al. |
| 6,371,096 | B1 | 4/2002 | Ohsaki et al. |
| 6,877,498 | B1 | 4/2005 | Matsushima et al. |
| 2004/0226282 | A1 | 11/2004 | Hattori |
| 2006/0277971 | A1 | 12/2006 | Tashiro et al. |
| 2010/0186491 | A1 | 7/2010 | Shibata et al. |
| 2010/0212414 | A1 | 8/2010 | Nakamura |
| 2012/0174900 | A1 | 7/2012 | Miyamoto et al. |
| 2016/0245723 | A1 | 8/2016 | Miyamoto et al. |

FOREIGN PATENT DOCUMENTS

| | | |
|---|---|---|
| JP | H06-74074 A | 3/1994 |
| JP | H06-273371 A | 9/1994 |
| JP | 2004-019542 A | 1/2004 |
| JP | 2004225684 A | 8/2004 |
| JP | 2004308574 A | 11/2004 |
| JP | 2005133620 A | 5/2005 |
| JP | 2006-125252 A | 5/2006 |
| JP | 2006343281 A | 12/2006 |
| JP | 2007032537 A | 2/2007 |
| JP | 2008274823 A | 11/2008 |
| JP | 2008-292444 A | 12/2008 |
| JP | 2009-156227 A | 7/2009 |
| JP | 2009209747 A | 9/2009 |
| JP | 2010025090 A | 2/2010 |
| JP | 2010-116857 A | 5/2010 |
| JP | 2010-159720 A | 7/2010 |
| JP | 2010196483 A | 9/2010 |
| WO | 2015/049726 A1 | 4/2015 |

OTHER PUBLICATIONS

Advisory Action for U.S. Appl. No. 15/026,099 dated Aug. 24, 2018. 3 pp.

USPTO, Non-Final Office action dated Oct. 5, 2018 in U.S. Appl. No. 15/026,099, 34 pages.

United States Patent and Trademark Office, Notice of Allowance issued in U.S. Appl. No. 15/026,099 dated Mar. 21, 2019. 10 pp.

* cited by examiner (A)

(B)

(A)

(B)

(A)

(B)

ABNORMALITY DIAGNOSIS SYSTEM OF AIR-FUEL RATIO SENSOR

CROSS-REFERENCE TO RELATED APPLICATIONS

This is a national phase application based on the PCT International Patent Application No. PCT/JP2014/076644 filed Sep. 30, 2014, claiming priority to Japanese Patent Application No. 2013-206620 filed Oct. 1, 2013, the entire contents of both of which are incorporated herein by reference.

TECHNICAL FIELD

The present invention relates to an abnormality diagnosis system of an air-fuel ratio sensor which is arranged in an exhaust passage of an internal combustion engine.

BACKGROUND ART

Known in the past has been an exhaust purification system which provides an air-fuel ratio sensor at an upstream side of an exhaust flow direction of an exhaust purification catalyst which is provided in an exhaust passage of an internal combustion engine and provides an oxygen sensor at a downstream side in the exhaust flow direction of the exhaust purification catalyst. In such an exhaust purification system, for example, the output of the upstream side air-fuel ratio sensor is used as the basis for feedback control of the amount of fuel which is supplied to the internal combustion engine so that the air-fuel ratio of the exhaust gas which flows into exhaust purification catalyst becomes the target air-fuel ratio (main feedback control) and the output of the downstream side oxygen sensor is used as the basis for feedback control of the target air-fuel ratio (sub feedback control).

In this regard, an oxygen sensor etc. which is used in such an internal combustion engine sometimes becomes abnormal due to cracking of the element which forms the sensor. In such a case, the sensor not longer generates a suitable output in accordance with the air-fuel ratio of the flowing exhaust gas. Therefore, it is known to provide an abnormality diagnosis system which diagnoses such an abnormality of a sensor.

In such an abnormality diagnosis system, for example, it is known to diagnose abnormality as follows: That is, when the output air-fuel ratio of the downstream side oxygen sensor becomes an air-fuel ratio leaner than the stoichiometric air-fuel ratio (below, also referred to as a "lean air-fuel ratio"), the air-fuel ratio of the exhaust gas which flows into the exhaust purification catalyst is made an air-fuel ratio richer than the stoichiometric air-fuel ratio (below, also referred to as a "rich air-fuel ratio"). After this, when the output air-fuel ratio of the downstream side oxygen sensor does not invert to the rich air-fuel ratio even if the stored amount of oxygen of the exhaust purification catalyst becomes zero, the oxygen sensor is diagnosed to have become abnormal due to a cracked element (for example, PLT 1). According to PLT 1, it is made possible to quickly and precisely detect abnormality of the oxygen sensor.

CITATIONS LIST

Patent Literature

PLT 1. Japanese Patent Publication No. 2004-019542A

SUMMARY OF INVENTION

Technical Problem

In this regard, the inventors of the present application proposed an abnormality diagnosis system which diagnoses a cracked element or other abnormality of an air-fuel ratio sensor which is arranged at a downstream side of an exhaust purification catalyst. According to this abnormality diagnosis system, if a target air-fuel ratio of exhaust gas which flows into the exhaust purification catalyst is made a rich air-fuel ratio and an output air-fuel ratio of an upstream side air-fuel ratio sensor is made a rich air-fuel ratio, when the output air-fuel ratio of the downstream side air-fuel ratio sensor changes from the stoichiometric air-fuel ratio to the lean air-fuel ratio, it is judged that the downstream side air-fuel ratio sensor is abnormal. On the other hand, in such a case, when the output air-fuel ratio of the downstream side air-fuel ratio sensor changes from the stoichiometric air-fuel ratio to a rich air-fuel ratio, it is judged that the downstream side air-fuel ratio sensor is normal.

In this way, according to research of the present inventors etc., it was learned that in an air-fuel ratio sensor which becomes abnormal due to a cracked element etc., sometimes an output similar to a normal air-fuel ratio sensor is temporarily generated in accordance with the state of the air-fuel ratio sensor or the state of the exhaust gas around the air-fuel ratio sensor and then the output changes. Therefore, even when the downstream side air-fuel ratio sensor becomes abnormal due to a cracked element etc., sometimes the output air-fuel ratio of the downstream side air-fuel ratio sensor temporarily changes from the stoichiometric air-fuel ratio to a rich air-fuel ratio. For this reason, as explained above, if judging normality of the downstream side air-fuel ratio sensor, sometimes a mistaken judgment will sometimes end up being performed.

Therefore, in consideration of the above problem, an object of the present invention is to provide an abnormality diagnosis system which can accurately judge normality of a downstream side air-fuel ratio sensor in the case of using a downstream side sensor constituted by an air-fuel ratio sensor.

Solution to Problem

To solve the above problem, in a first aspect of the invention, there is provided an abnormality diagnosis system of an air-fuel ratio sensor comprising an exhaust purification catalyst provided in an exhaust passage of an internal combustion engine, an upstream side air-fuel ratio sensor provided in the exhaust passage at an upstream side of the exhaust purification catalyst in the exhaust flow direction, a downstream side air-fuel ratio sensor provided in the exhaust passage at a downstream side of the exhaust purification catalyst in the exhaust flow direction, and a diagnosis device for diagnosing abnormality of the downstream side air-fuel ratio sensor, based on outputs of these air-fuel ratio sensors, wherein the diagnosis device judges that the downstream side air-fuel ratio sensor is normal in the case where an output air-fuel ratio of the upstream side air-fuel ratio sensor becomes a rich air-fuel ratio which is richer than the stoichiometric air-fuel ratio and when a timer counter which counts the time during which an output air-fuel ratio of the downstream side air-fuel ratio sensor becomes a rich judgment reference air-fuel ratio which is richer than a stoichiometric air-fuel ratio or less becomes a predetermined judgment value larger than zero.

In a second aspect of the invention, there is provided the first aspect of the invention wherein the diagnosis device changes a count up amount of the time counter in accordance with a rich degree when an output air-fuel ratio of the downstream side air-fuel ratio sensor becomes the rich judgment reference air-fuel ratio or less.

In a third aspect of the invention, there is provided the second aspect of the invention wherein the diagnosis device increases the count up amount of the time counter the larger the rich degree when the output air-fuel ratio of the downstream side air-fuel ratio sensor becomes the rich judgment reference air-fuel ratio or less.

In a fourth aspect of the invention, there is provided the first aspect of the invention wherein the diagnosis device changes the judgment value in accordance with a rich degree when the output air-fuel ratio of the downstream side air-fuel ratio sensor becomes the rich judgment reference air-fuel ratio or less.

In a fifth aspect of the invention, there is provided the third aspect of the invention wherein the diagnosis device changes the judgment value so that the judgment value becomes smaller the larger the rich degree when the output air-fuel ratio of the downstream side air-fuel ratio sensor becomes the rich judgment reference air-fuel ratio or less.

In a sixth aspect of the invention, there is provided any of the first to fifth aspects of the invention wherein the diagnosis device judges that the downstream side air-fuel ratio sensor is normal when the output air-fuel ratio of the downstream side air-fuel ratio sensor becomes a normality judgment reference air-fuel ratio which is richer than the rich judgment reference air-fuel ratio or less even if the time counter is less than the judgment value.

In a seventh aspect of the invention, there is provided any of the first to sixth aspects of the invention wherein the system further comprises a flow rate detecting means for detecting or estimating a flow rate of the downstream side exhaust gas flowing around the air-fuel ratio sensor, and wherein the diagnosis device changes the judgment value in accordance with the flow rate which is detected or estimated by the flow rate detecting means when the output air-fuel ratio of the downstream side air-fuel ratio sensor becomes the rich judgment reference air-fuel ratio or less.

In an eighth aspect of the invention, there is provided the seventh aspect of the invention wherein the diagnosis device changes the judgment value so that the judgment value becomes smaller the larger the flow rate detected by the flow rate detecting means when the output air-fuel ratio of the downstream side air-fuel ratio sensor becomes the rich judgment reference air-fuel ratio or less.

To solve the above problem, in a ninth aspect of the invention, there is provided an abnormality diagnosis system of an air-fuel ratio sensor comprising an exhaust purification catalyst provided in an exhaust passage of an internal combustion engine, an upstream side air-fuel ratio sensor provided in the exhaust passage at an upstream side of the exhaust purification catalyst in the exhaust flow direction, a downstream side air-fuel ratio sensor provided in the exhaust passage at a downstream side of the exhaust purification catalyst in the exhaust flow direction, and a diagnosis device which uses outputs of these air-fuel ratio sensors as the basis to diagnose abnormality of the downstream side air-fuel ratio sensor, in which abnormality diagnosis system of an air-fuel ratio sensor, wherein the system further comprises a flow rate detecting means for detecting or estimating a flow rate of the downstream side exhaust gas flowing around the air-fuel ratio sensor, and wherein the diagnosis device judges that the downstream side air-fuel ratio sensor is normal in the case where an output air-fuel ratio of the upstream side air-fuel ratio sensor becomes a rich air-fuel ratio which is richer than the stoichiometric air-fuel ratio, and when an output air-fuel ratio of the downstream side air-fuel ratio sensor becomes a rich judgment reference air-fuel ratio which is richer than a stoichiometric air-fuel ratio or less, and the cumulative value which is detected or estimated by the flow rate detecting means becomes a given judgment value larger than zero.

In a 10th aspect of the invention, there is provided the ninth aspect of the invention wherein the diagnosis device changes the judgment value in accordance with a rich degree when an output air-fuel ratio of the downstream side air-fuel ratio sensor becomes a rich judgment reference air-fuel ratio or less.

In an 11th aspect of the invention, there is provided the ninth or 10th aspect of the invention wherein the diagnosis device judges that the downstream side air-fuel ratio sensor is normal, even when the cumulative value is less than the judgment value, when an output air-fuel ratio of the downstream side air-fuel ratio sensor becomes a normality judgment reference air-fuel ratio which is richer than the rich judgment reference air-fuel ratio or less.

In a 12th aspect of the invention, there is provided any of the first to 11th aspects of the invention wherein the diagnosis device judges that the downstream side air-fuel ratio sensor has become abnormal in the case where an output air-fuel ratio of the upstream side air-fuel ratio sensor is a rich air-fuel ratio which is richer than the stoichiometric air-fuel ratio and when an output air-fuel ratio of the downstream side air-fuel ratio sensor changes from an air-fuel ratio which is richer than a lean judgment reference air-fuel ratio which is leaner than the stoichiometric air-fuel ratio to the lean judgment reference air-fuel ratio or more.

In a 13th aspect of the invention, there is provided any of the first to 12th aspects of the invention wherein the abnormality diagnosis system can perform active control which controls the target air-fuel ratio of the exhaust gas flowing into exhaust purification catalyst to an active control rich air-fuel ratio which is richer than the stoichiometric air-fuel ratio so as to diagnose abnormality of the upstream side air-fuel ratio sensor 40, and wherein the diagnosis device calculates the amount of oxygen which is insufficient when trying to make the air-fuel ratio of the exhaust gas flowing into exhaust purification catalyst the stoichiometric air-fuel ratio as the oxygen shortage, and suspends the active control when the cumulative value of oxygen shortage from when the active control is started reaches an upper limit value of the maximum storable oxygen amount of the exhaust purification catalyst or more before the downstream side air-fuel ratio sensor is either judged normal or judged abnormal.

In a 14th aspect of the invention, there is provided the 13th aspect of the invention wherein the diagnosis device judges that the downstream side air-fuel ratio sensor has become abnormal when the cumulative value of oxygen shortage from when the active control is started reaches an upper limit value of the maximum storable oxygen amount of the exhaust purification catalyst or more before the downstream side air-fuel ratio sensor is either judged normal or judged abnormal.

In a 15th aspect of the invention, there is provided the 12th or 13th aspect of the invention wherein an alarm lamp is lit up when it is judged that the downstream side air-fuel ratio sensor has become abnormal.

Advantageous Effects of Invention

According to the present invention, there is provided an abnormality diagnosis system which can accurately judge

DESCRIPTION OF EMBODIMENT

Figure 1:
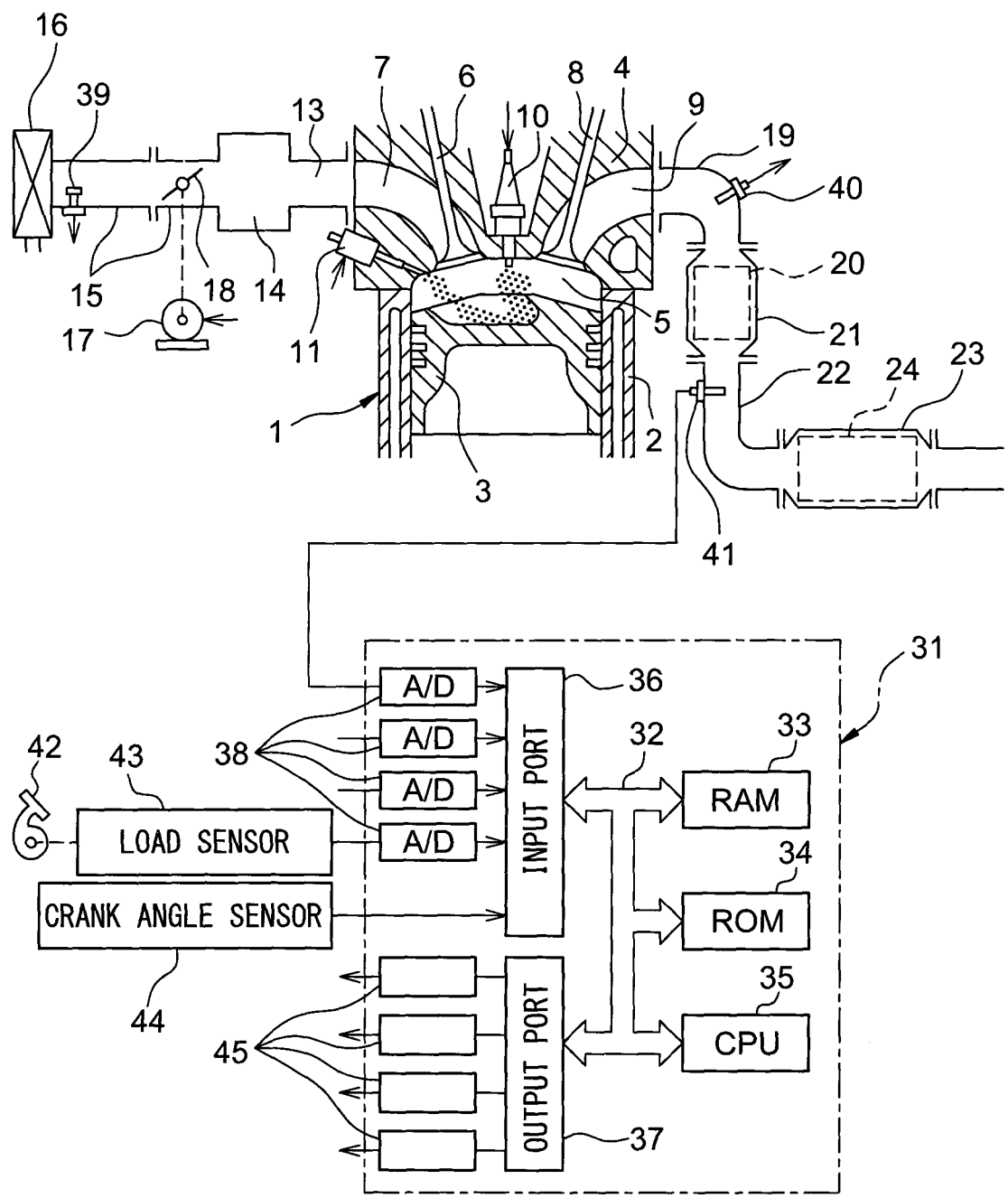
FIG. 1 is a view which schematically shows an internal combustion engine in which an abnormality diagnosis system according to a first embodiment of the present invention is used.

Below, referring to the drawings, an embodiment of the present invention will be explained in detail. Note that, in the following explanation, similar component elements are assigned the same reference numerals <Explanation of Internal Combustion Engine as a Whole>

FIG. 1 is a view which schematically shows an internal combustion engine in which an abnormality diagnosis system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the abnormality diagnosis system of the present invention may also use another fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory). 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as abnormality diagnosis system for diagnosing abnormality of the internal combustion engine (in particular, the upstream side exhaust purification catalyst 20 and the downstream side exhaust purification catalyst 24).

The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas which flows into the exhaust purification catalysts 20 and 24 is leaner than the stoichiometric air-fuel ratio (hereinafter, referred to as "lean air-fuel ratio"). On the other hand, the exhaust purification catalysts 20 and 24 release the oxygen which is stored in the exhaust purification catalysts 20 and 24 when the inflowing exhaust gas has an air-fuel ratio which is richer than the stoichiometric air-fuel ratio (hereinafter, referred to as "rich air-fuel ratio"). As a result, as long as the oxygen storage ability of the exhaust purification catalysts 20 and 24 is maintained, the exhaust gas flowing out from the exhaust purification catalysts 20 and 24 has substantially stoichiometric air fuel ratio, regardless the air-fuel ratio of the exhaust gas flowing into the exhaust purification catalyst 20 and 24.

Explanation of Air-Fuel Ratio Sensor

Figure 2:
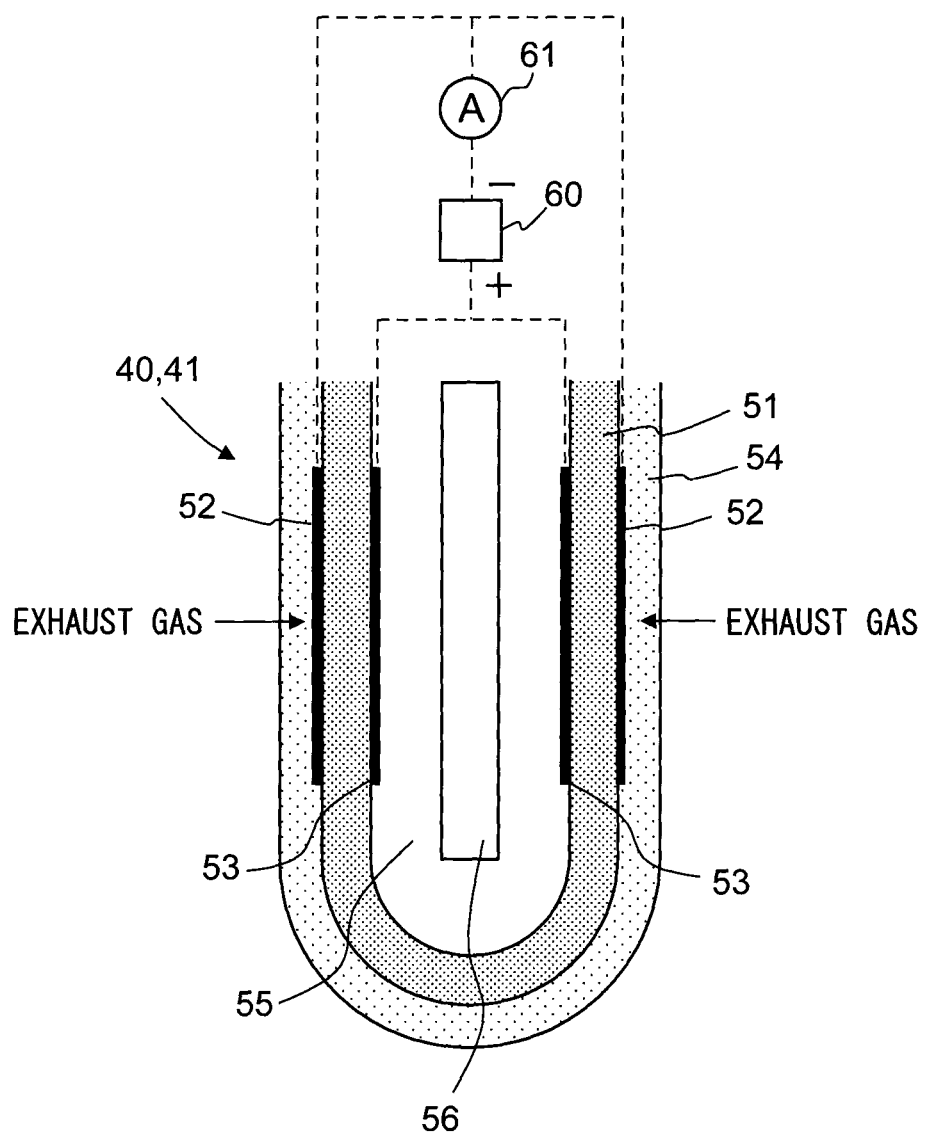
FIG. 2 is a schematic cross-sectional view of an air-fuel ratio sensor.

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41.

In particular, in each of the cup type air-fuel ratio sensors 40 and 41 of the present embodiment, the solid electrolyte layer 51 is formed into a cylindrical shape with one closed end. Inside of the reference gas chamber 55 which is defined inside of it, atmospheric gas (air) is introduced and the heater part 56 is arranged. On the inside surface of the solid electrolyte layer 51, an atmosphere side electrode 53 is arranged. On the outside surface of that, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage by the voltage control device 60. The current which is detected by this current detection device 61 is the output current of the air-fuel ratio sensors 40 and 41.

Figure 3:
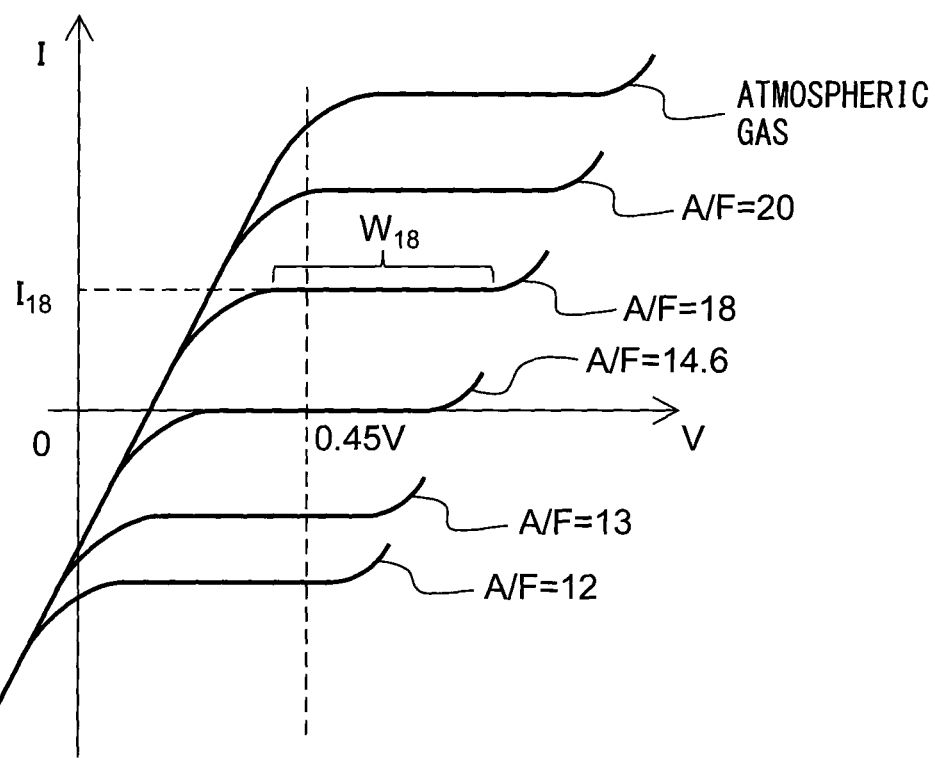
FIG. 3 is a view which shows the relationship between the voltage supplied to the sensor and output current at different exhaust air-fuel ratios.

The thus configured air-fuel ratio sensors 40 and 41 have the voltage-current (V-I) characteristic such as shown in FIG. 3. As will be understood from FIG. 3, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 3, the limit current region and limit current when the exhaust air-fuel ratio is 18 are shown by $W_{18}$ and $I_{18}$.

Figure 4:
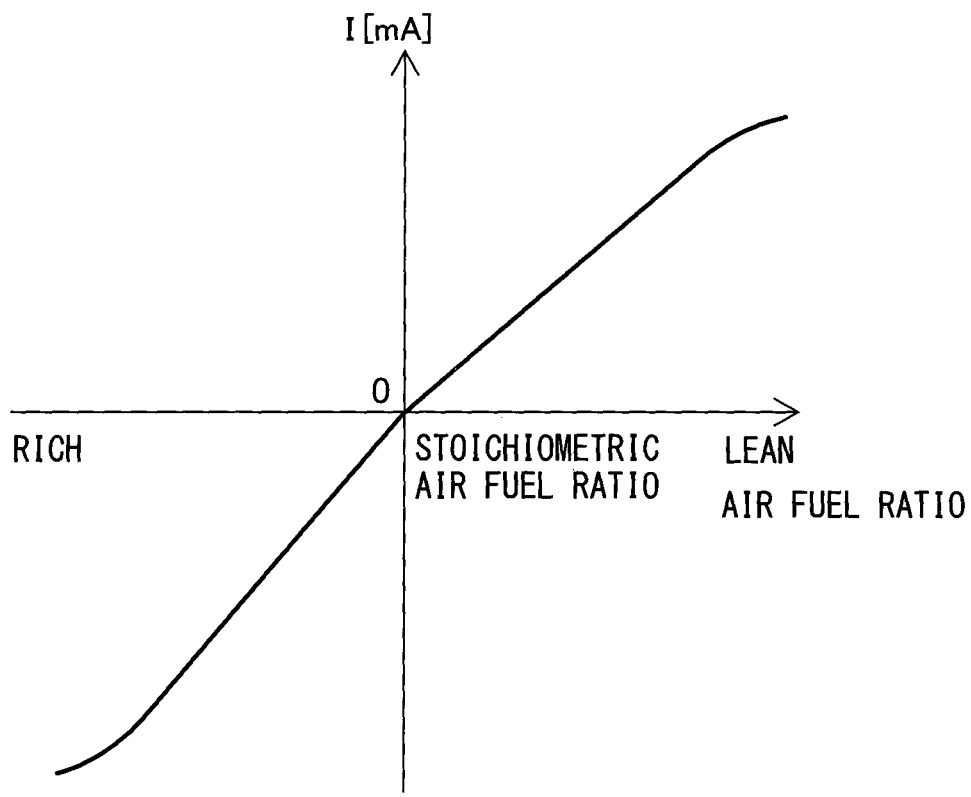
FIG. 4 is a view which shows a relationship between an exhaust air-fuel ratio and an output current when making an applied voltage constant.

FIG. 4 is a view which shows the relationship between the exhaust air-fuel ratio and the output current I when making the supplied voltage constant at about 0.45V. As will be understood from FIG. 4, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure which is shown in FIG. 2 are used. However, as the upstream side air-fuel ratio sensor 40, for example, it is also possible to use a layered-type limit current type air-fuel ratio sensor or other structure of limit current type air-fuel ratio sensor or air-fuel ratio sensor not a limit current type or any other air-fuel ratio sensor.

<Basic Control>

In the internal combustion engine which is configured in this way, the outputs of the upstream side air-fuel ratio sensor 40 and the downstream side air-fuel ratio sensor 41 are used as the basis to set the fuel injection amount from the fuel injector 11 so that the air-fuel ratio of the exhaust gas which flows into the upstream side exhaust purification catalyst 20 becomes the optimum air-fuel ratio based on the engine operating state. As a method of setting such a fuel injection amount, the method of using the output of the upstream side air-fuel ratio sensor 40 as the basis to control the air-fuel ratio of the exhaust gas which flows into the upstream side exhaust purification catalyst 20 (or the target air-fuel ratio of the exhaust gas which flows out from the engine body) to become the target air-fuel ratio and using the output of the downstream side air-fuel ratio sensor 41 as the basis to correct the output of the upstream side air-fuel ratio sensor 40 or change the target air-fuel ratio.

Figure 5:
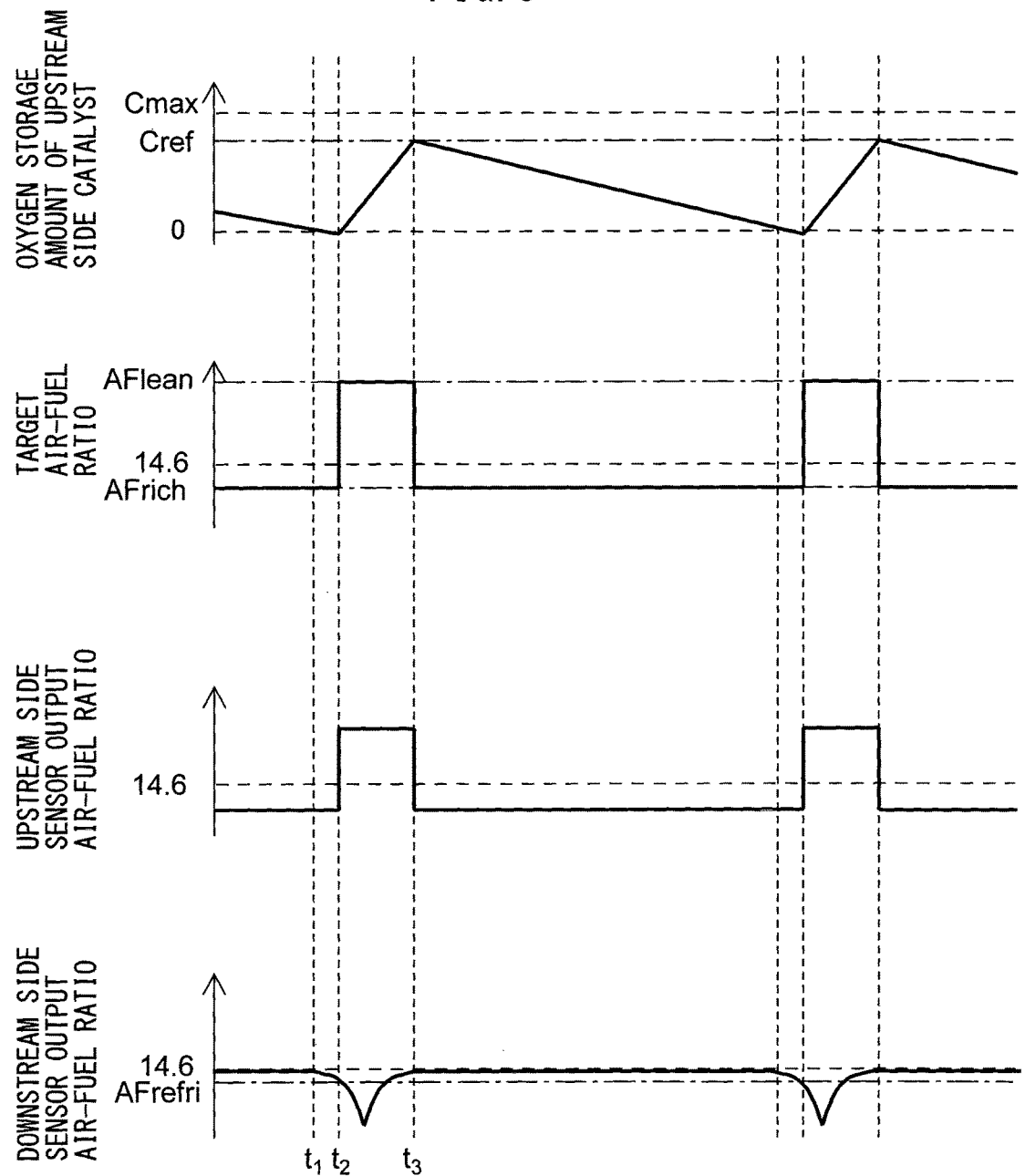
FIG. 5 is a time chart of a stored amount of oxygen of an upstream side exhaust purification catalyst at the time of ordinary operation of an internal combustion engine.

Referring to FIG. 5, an example of such control of the target air-fuel ratio will be simply explained. FIG. 5 is a time chart of factors at the time of normal operation (normal control) of the internal combustion engine such as the stored amount of oxygen of the upstream side exhaust purification catalyst, target air-fuel ratio, output air-fuel ratio of the upstream side air-fuel ratio sensor, and output air-fuel ratio of the downstream side air-fuel ratio sensor. Note that, "output air-fuel ratio" means an air-fuel ratio which corresponds to output of an air-fuel ratio sensor. Further, "at the time of normal operation (normal control)" means the operating state (control state) when not performing control to adjust the fuel injection amount in accordance with a specific operating state of the internal combustion engine (for example, correction to increase fuel injection amount which is performed at the time of acceleration of the vehicle which mounts the internal combustion, later explained fuel cut control, etc.)

In the example which is shown in FIG. 5, when the output air-fuel ratio of the downstream side air-fuel ratio sensor 41 becomes the rich judgment reference air-fuel ratio (for example, 14.55) or less, the target air-fuel ratio is set to and maintained at the lean set air-fuel ratio AFTlean (for example, 15). After this, if the stored amount of oxygen of the upstream side exhaust purification catalyst 20 is estimated and this estimated value becomes a predetermined judgment reference stored amount Cref (amount smaller than maximum stored amount of oxygen Cmax) or more, the target air-fuel ratio is set to the rich set air-fuel ratio AFTrich (for example, 14.4) and maintained there. In the example which is shown in FIG. 5, such an operation is repeated.

Specifically, in the example which is shown in FIG. 5, before the time $t_1$, the target air-fuel ratio is made the rich set air-fuel ratio AFTrich. Along with this, the output air-fuel ratio of the upstream side air-fuel ratio sensor 40 also becomes a rich air-fuel ratio. Further, the upstream side exhaust purification catalyst 20 stores oxygen, so the output air-fuel ratio of the downstream side air-fuel ratio sensor 41 becomes a substantially stoichiometric air-fuel ratio (14.6). At this time, the air-fuel ratio of the exhaust gas which flows into the upstream side exhaust purification catalyst 20 becomes a rich air-fuel ratio, so the upstream side exhaust purification catalyst 20 gradually falls in stored amount of oxygen.

After this, at the time $t_1$, the upstream side exhaust purification catalyst 20 approaches zero in stored amount of oxygen whereby part of the unburned gas which flows into the upstream side exhaust purification catalyst 20 starts to flow out without being purified by the upstream side exhaust purification catalyst 20. As a result, at the time $t_2$, the output air-fuel ratio of the downstream side air-fuel ratio sensor 41 becomes a rich judgment reference air-fuel ratio AFrefri which is slightly richer than the stoichiometric air-fuel ratio. At this time, the target air-fuel ratio is switched from the rich set air-fuel ratio AFTrich to the lean set air-fuel ratio AFTlean.

By switching of the target air-fuel ratio, the air-fuel ratio of the exhaust gas which flows into the upstream side exhaust purification catalyst 20 becomes a lean air-fuel ratio and the outflow of unburned gas is reduced and stops. Further, the upstream side exhaust purification catalyst 20 gradually increases in stored amount of oxygen. At the time $t_3$, it reaches the judgment reference stored amount Cref. In this way, if the stored amount of oxygen reaches the judgment reference stored amount Cref, the target air-fuel ratio is again switched from the lean set air-fuel ratio AFlena to the rich set air-fuel ratio AFTrich. By switching of this target air-fuel ratio, the air-fuel ratio of the exhaust gas which flows into the upstream side exhaust purification catalyst 20 again becomes the lean air-fuel ratio. As a result, the upstream side exhaust purification catalyst 20 gradually falls in stored amount of oxygen. After this, this operation is repeated. By performing such control, $NO_X$ can be prevented from flowing out from the upstream side exhaust purification catalyst 20.

Note that, control of the target air-fuel ratio based on the outputs of the upstream side air-fuel ratio sensor 40 and downstream side air-fuel ratio sensor 41 which is performed as normal control is not limited to the above-explained control. If control based on the outputs of these air-fuel ratio sensors 40 and 41, any type of control is possible. Therefore, for example, as normal control, it is also possible to fix the target air-fuel ratio at the stoichiometric air-fuel ratio and perform feedback control so that the output air-fuel ratio of the upstream side air-fuel ratio sensor 40 becomes the stoichiometric air-fuel ratio and to perform control to use the output air-fuel ratio of the downstream side air-fuel ratio sensor 41 as the basis to correct the output air-fuel ratio of the upstream side air-fuel ratio sensor 40.

<Cracked Element of Air-Fuel Ratio Sensor>

Figure 6:
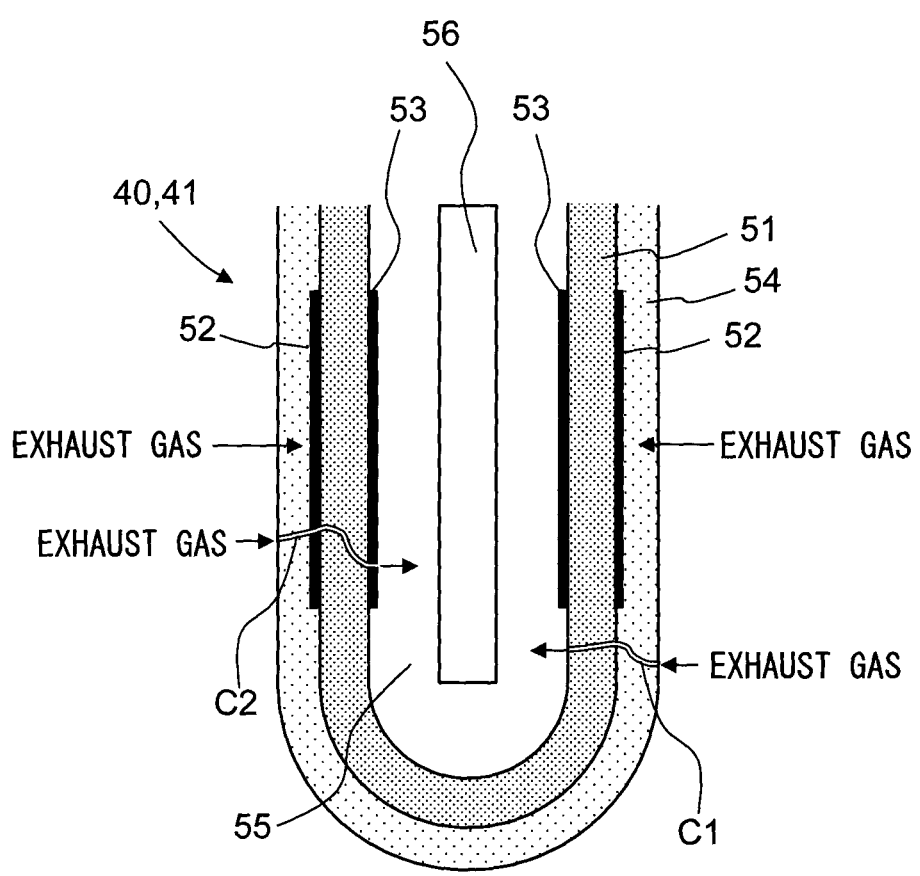
FIG. 6 is a schematic cross-sectional view of an air-fuel ratio sensor which becomes abnormal due to a cracked element.

In this regard, as an abnormality which occurs as the above-mentioned air-fuel ratio sensors 40 and 41, the phenomenon of the element forming the air-fuel ratio sensor 40 or 41 cracking, that is, a cracked element, may be mentioned. Specifically, a crack may occur passing through the solid electrolyte layer 51 and diffusion regulation layer 54 (FIG. 6, C1) or a crack may occur passing through the solid electrolyte layer 51 and diffusion regulation layer 54 and also the two electrodes 52 and 53 (FIG. 6, C2). If such a cracked element occurs, as shown in FIG. 6, exhaust gas enters inside of the reference gas chamber 55 through the cracked part.

As a result, when the air-fuel ratio of the exhaust gas around the air-fuel ratio sensors 40 and 41 is the rich air-fuel ratio, the rich air-fuel ratio exhaust gas enters into the reference gas chamber 55. Due to this, the rich air-fuel ratio exhaust gas diffuses inside the reference gas chamber 55 and the atmosphere side electrode 53 is exposed to the rich air-fuel ratio exhaust gas. On the other hand, in this case as well, the exhaust side electrode 52 is exposed to the exhaust gas through the diffusion regulation layer 54. For this reason, the exhaust side electrode 52 becomes relatively lean compared with the atmosphere side electrode 53 and as a result the output air-fuel ratios of the air-fuel ratio sensors 40 and 41 become lean air-fuel ratios. That is, if the air-fuel ratio sensors 40 and 41 suffer from cracked elements, even if the air-fuel ratios of the exhaust gas around the air-fuel ratio sensors 40 and 41 become rich air-fuel ratios, the output air-fuel ratios of the air-fuel ratio sensors 40 and 41 end up becoming lean air-fuel ratios. On the other hand, when the air-fuel ratios of the exhaust gas around the air-fuel ratio sensors 40 and 41 are lean air-fuel ratios, the phenomenon of inversion of the output air-fuel ratio does not occur. This is because when the air-fuel ratio of the exhaust gas is a lean air-fuel ratio, the output currents of the air-fuel ratio sensors 40 and 41 depend on the amount of oxygen which reaches the exhaust side electrode 52 surface through the diffusion regulation layer 54 rather than the difference of the air-fuel ratios at the two sides of the solid electrolyte layer 51.

<Basic Abnormality Diagnosis Control>

In the present embodiment, the above-mentioned property of the abnormality of a cracked element of the downstream side air-fuel ratio sensor 41 is utilized to diagnose abnormality based on a cracked element of the downstream side air-fuel ratio sensor 41. Specifically, the ECU 31 performs active control when predetermined conditions stand. In active control, the fuel injection amount from the fuel injector 11 is controlled so that the target air-fuel ratio of the exhaust gas which flows into the upstream side exhaust purification catalyst 20 (or the target air-fuel ratio of the exhaust gas which flows out from the engine body) becomes a rich air-fuel ratio. Further, along with this, the actual air-fuel ratio of the exhaust gas which flows into the upstream side exhaust purification catalyst 20 becomes the rich air-fuel ratio.

Figure 7:
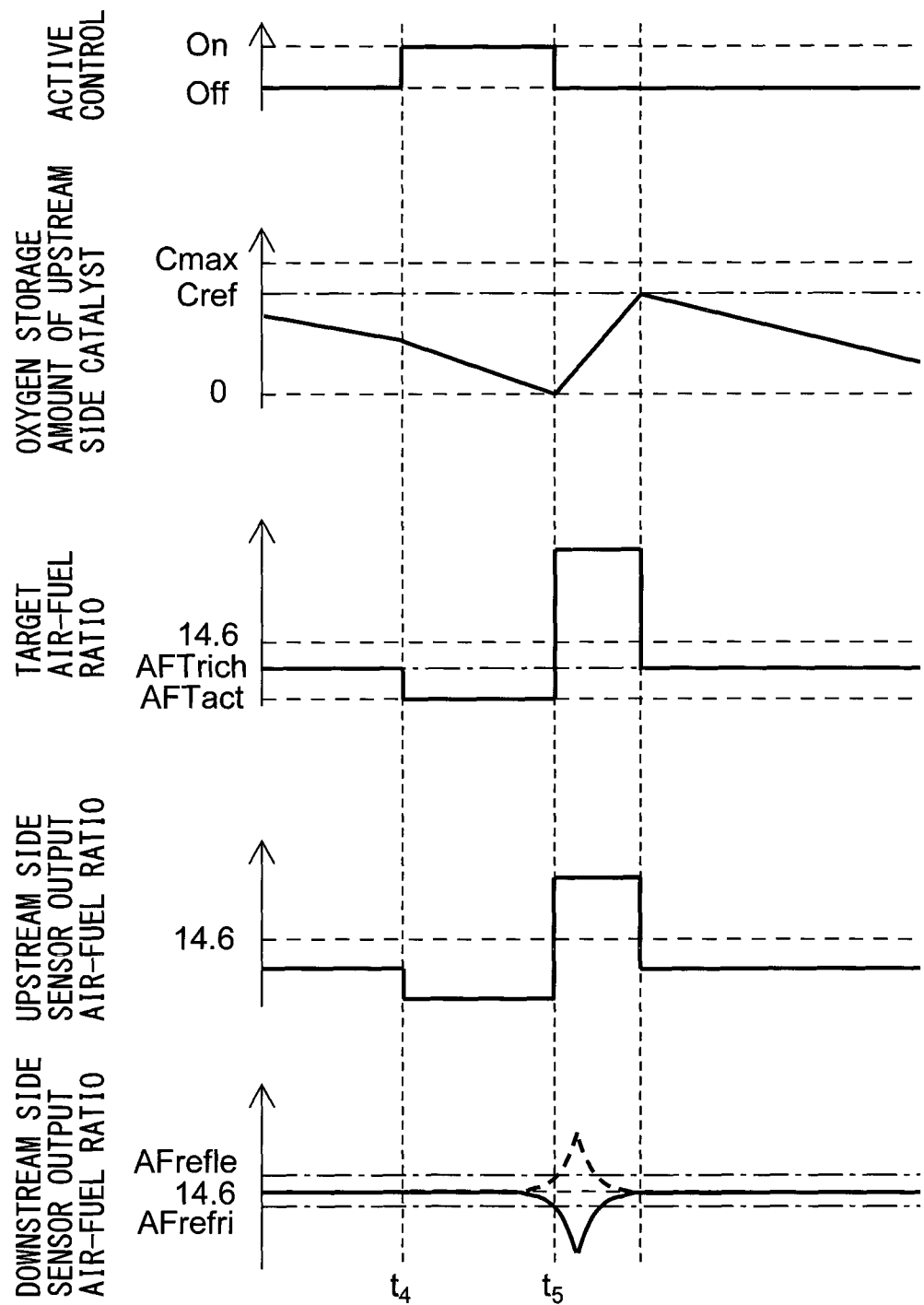
FIG. 7 is a time chart of an output air-fuel ratio etc. of an air-fuel ratio sensor in the case of active control.

FIG. 7 is a time chart of the output air-fuel ratio of an air-fuel ratio sensor in the case of active control. In the example which is shown in FIG. 7, at the time $t_4$, active control is started. When active control is started at the time $t_4$, the target air-fuel ratio is set to the rich air-fuel ratio. In particular, in the illustrated example, the target air-fuel ratio at the time of active control is made an active control air-fuel ratio. AFact which is richer than the rich set air-fuel ratio which is set at the time of normal operation. At this time, the output air-fuel ratio of the upstream side air-fuel ratio sensor 40 becomes the rich air-fuel ratio. On the other hand, the unburned HC etc. in the exhaust gas which flows into the upstream side exhaust purification catalyst 20 is removed by reaction with the oxygen which is stored in the upstream side exhaust purification catalyst 20. For this reason, the output air-fuel ratio of the downstream side air-fuel ratio sensor 41 becomes substantially the stoichiometric air-fuel ratio.

Due to active control, rich air-fuel ratio exhaust gas flows into the upstream side exhaust purification catalyst 20, so the upstream side exhaust purification catalyst 20 gradually is reduced in stored amount of oxygen. During this interval as well, the output air-fuel ratio of the upstream side air-fuel ratio sensor 40 becomes the rich air-fuel ratio and the output air-fuel ratio of the downstream side air-fuel ratio sensor 41 become substantially the stoichiometric air-fuel ratio. Finally, the stored amount of oxygen becomes substantially zero. Due to this, rich air-fuel ratio exhaust gas containing unburned HC etc. flows out from the upstream side exhaust purification catalyst 20. That is, the actual air-fuel ratio of the exhaust gas which flows around the downstream side air-fuel ratio sensor 41 becomes the rich air-fuel ratio.

Here, when the downstream side air-fuel ratio sensor 41 has not become abnormal due to a cracked element (that is, when it is normal), basically, as shown in FIG. 7 by the solid line, the output air-fuel ratio of the downstream side air-fuel ratio sensor 41 also becomes the rich air-fuel ratio in accordance with the actual air-fuel ratio. Therefore, in the present embodiment, when the output air-fuel ratio of the upstream side air-fuel ratio sensor 40 becomes the rich air-fuel ratio, the output air-fuel ratio of the downstream side air-fuel ratio sensor 41 becomes an air-fuel ratio leaner than the rich judgment reference air-fuel ratio AFrefri (for example, substantially stoichiometric air-fuel ratio), so when changing to an air-fuel ratio richer than this, basically it is judged that the downstream side air-fuel ratio sensor 41 has not become abnormal due to a cracked element (that is, it is normal). Note that, in the present embodiment, the rich judgment reference air-fuel ratio AFrefri at this time is the same as the rich judgment reference air-fuel ratio AFrefri at the time of normal operation, but it may also be a different value.

On the other hand, when the downstream side air-fuel ratio sensor 41 has become abnormal due to a cracked element, as shown in FIG. 7 by a broken line, unlike the actual air-fuel ratio, the output air-fuel ratio of the downstream side air-fuel ratio sensor 41 becomes the lean air-fuel ratio. Therefore, in the present embodiment, when the output air-fuel ratio of the upstream side air-fuel ratio sensor 40 becomes the rich air-fuel ratio, it is judged that the downstream side air-fuel ratio sensor 41 has become abnormal due to a cracked element when the output air-fuel ratio of the downstream side air-fuel ratio sensor 41 changes from an air-fuel ratio richer than the lean judgment reference air-fuel ratio AFrefle which is slightly leaner than the stoichiometric air-fuel ratio (for example, substantially stoichiometric air-fuel ratio) to an air-fuel ratio which is leaner than this (time $t_5$).

If the downstream side air-fuel ratio sensor 41 is diagnosed abnormal in this way, the active control is stopped and normal operation is resumed. In particular, in the example which is shown in FIG. 7, the downstream side air-fuel ratio sensor 41 is diagnosed abnormal at the time $t_5$, so active control is made to stop at the time $t_5$. After this, if normal operation is resumed, the output air-fuel ratio of the downstream side air-fuel ratio sensor 41 becomes the rich judgment reference air-fuel ratio AFrefri or less, so the target air-fuel ratio is set to the lean set air-fuel ratio AFTlean and the control which is shown in FIG. 5 is repeated.

In this way, according to the present embodiment, when the output air-fuel ratio of the upstream side air-fuel ratio sensor is the rich air-fuel ratio, the output air-fuel ratio of the downstream side air-fuel ratio sensor 41 becomes substantially the stoichiometric air-fuel ratio once, then the downstream side air-fuel ratio sensor 41 is diagnosed abnormal based on what kind of air-fuel ratio is changed to. Due to this, the air-fuel ratio sensor constituted by the downstream side sensor can be diagnosed abnormal due to a cracked element.

Note that, the above-mentioned rich judgment reference air-fuel ratio AFrefri and lean judgment reference air-fuel ratio AFrefle are made air-fuel ratios outside the scope at which the output air-fuel ratio of a normal air-fuel ratio sensor fluctuates near the stoichiometric air-fuel ratio when the stored amount of oxygen of the upstream side exhaust purification catalyst 20 is a medium extent of amount.

In this regard, in the present embodiment, active control is performed when certain conditions stand and is not performed when they do not stand. In other words, the downstream side air-fuel ratio sensor 41 is diagnosed abnormal when certain conditions stand and is not when they do not stand.

Here, "when certain conditions stand" means, for example, when all of the following conditions are satisfied. One condition is that the two air-fuel ratio sensors 40 and 41 are active, that is, the temperatures of the two air-fuel ratio sensors 40 and 41 become the activation temperature or more. If the air-fuel ratio sensors 40 and 41 are not activated, basically it is not possible to accurately detect the air-fuel ratio of the exhaust gas. On top of this, even if the abnormality of a cracked element occurs, deviation of the output air-fuel ratio becomes harder to occur.

Figure 8:
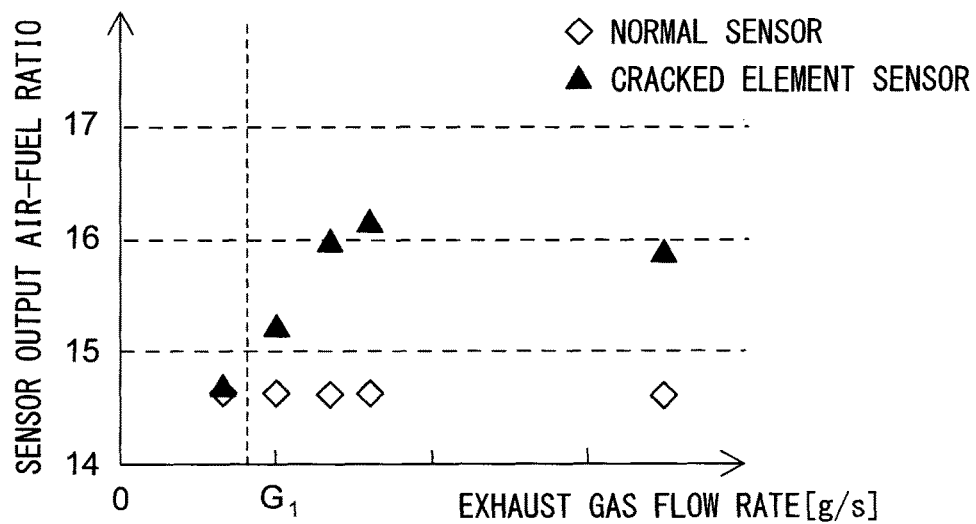
FIG. 8 is a view which shows a relationship between a flow rate of exhaust gas which flows around a downstream side air-fuel ratio sensor and an output air-fuel ratio of a downstream side air-fuel ratio sensor.

A second condition is that the flow rate of the exhaust gas which flows around the downstream side air-fuel ratio sensor 41 becomes a predetermined lower limit flow rate or more. FIG. 8 is a view which shows the relationship between the flow rate of the exhaust gas which flows around the downstream side air-fuel ratio sensor 41 and the output air-fuel ratio of the downstream side air-fuel ratio sensor 41. In the illustrated example, the air-fuel ratio of the exhaust gas which flows around the downstream side air-fuel ratio sensor 41 becomes a rich air-fuel ratio which is slightly richer than the stoichiometric air-fuel ratio.

As will be understood from FIG. 8, when the flow rate of the exhaust gas which flows around the downstream side air-fuel ratio sensor 41 is small, there is almost no difference in the output air-fuel ratio between a normal sensor and a sensor which suffers from a cracked element. As opposed to this, if the flow rate of the exhaust gas becomes larger, at a sensor which suffers from a cracked element, the output air-fuel ratio becomes lean. Therefore, if the flow rate of the exhaust gas which flows around the downstream side air-fuel ratio sensor 41 is small, no change occurs in the output air-fuel ratio even if the abnormality of a cracked element occurs.

In addition, as shown in FIG. 8, in a sensor at which a cracked element occurs, as the flow rate of the exhaust gas which flows around the downstream side air-fuel ratio sensor 41 becomes smaller, the output air-fuel ratio of the downstream side air-fuel ratio sensor 41 shifts to the lean side. Therefore, when the flow rate of the exhaust gas which flows around the downstream side air-fuel ratio sensor 41 is small, even if a cracked element occurs, the lean degree at the output air-fuel ratio of the downstream side air-fuel ratio sensor 41 becomes small and does not reach the lean judgment reference air-fuel ratio AFrefri in some cases.

Therefore, in the present embodiment, the flow rate of the exhaust gas being a predetermined lower limit flow rate, that is, the flow rate where the output air-fuel ratio changes between a normal sensor and a sensor which suffers from a cracked element (for example, FIG. 8, $G_1$) or more is made a condition for active control.

Note that, the flow rate of the exhaust gas which flows around the downstream side air-fuel ratio sensor 41 is, for example, calculated and estimated based on the air flow rate which is detected by the air flow meter 39 etc. However, the flow rate of exhaust gas may also be estimated by another technique. Alternatively, it is possible to provide an air flow meter which detects the flow rate of the exhaust gas which flows inside the exhaust passage near the downstream side air-fuel ratio sensor 41 and use this air flow meter etc. to directly detect the flow rate.

A third condition is that the elapsed time from the end of fuel cut control be a reference elapsed time or more. "Fuel cut control" is control which suspends or greatly reduces the supply of fuel to the combustion chamber in the state where the internal combustion engine is operating (state where crankshaft is turning). This fuel cut control is performed when, for example, the amount of depression of the accelerator pedal 42 is zero or substantially zero (that is, the engine load is zero or substantially zero) and the engine speed is a predetermined speed higher than the speed at the time of idling or more.

Right after the end of such fuel cut control, even when controlling the fuel injection amount so that the air-fuel ratio of the exhaust gas which is exhausted from the engine body becomes the rich air-fuel ratio, the output air-fuel ratio becomes the lean air-fuel ratio even in a normal air-fuel ratio sensor where the element has not cracked. For this reason, until a certain extent of elapsed time passes from when the fuel cut control is ended, it is not possible to accurately diagnose a cracked element of the downstream side air-fuel ratio sensor 41. Therefore, in the present embodiment, the elapsed time from the end of fuel cut control becoming the reference elapsed time or more, that is, the time required for the output air-fuel ratio to become stable after the end of fuel cut control in a normal air-fuel ratio sensor or more is made a condition for active control.

A fourth condition is that the abnormality judgment of the downstream side air-fuel ratio sensor 41 not be completed from when the ignition switch of the vehicle which carries the internal combustion engine is turned ON to the present. The downstream side air-fuel ratio sensor 41 does not have to be judged for abnormality that frequently, so abnormality judgment is performed only when the abnormality judgment has not been completed. Specifically, an abnormality flag which is set ON when the downstream side air-fuel ratio sensor 41 is judged abnormal in abnormality judgment or a judgment completion flag which is set ON when the abnormality judgment of the downstream side air-fuel ratio sensor 41 has been completed not be ON is made a condition.

Note that, in the above embodiment, at the time of normal operation, the target air-fuel ratio of the exhaust gas which flows into the upstream side exhaust purification catalyst 20 is alternately changed to the rich air-fuel ratio and the lean air-fuel ratio. In such a case, at the time of active control, the target air-fuel ratio is made an air-fuel ratio whereby the air-fuel ratio of the exhaust gas which flows into the exhaust purification catalyst becomes richer than the rich air-fuel ratio at the time of normal operation (normal control) (in the above embodiment, rich set air-fuel ratio AFTrich).

Further, in the above embodiment, active control is performed when diagnosing abnormality of the downstream side air-fuel ratio sensor 41. However, it is not necessarily required that active control be performed when diagnosing abnormality of the downstream side air-fuel ratio sensor 41.

For example, right after the end of fuel cut control, in general, post-reset rich control is performed for making the air-fuel ratio of the exhaust gas which flows into the upstream side exhaust purification catalyst 20 the rich air-fuel ratio. This is performed to release part or all of the oxygen which was stored in the upstream side exhaust purification catalyst 20 during fuel cut control. The downstream side air-fuel ratio sensor 41 may also be diagnosed for abnormality during this post-reset rich control. However, in this case as well, as explained above, an elapsed time from the end of fuel cut control has to be the reference elapsed time or more.

<Normality Judgment at Abnormality Diagnosis>

In this regard, as shown in FIG. 8, in an air-fuel ratio sensor where the element has cracked, the output air-fuel ratio changes in accordance with the flow rate of exhaust gas. When the air-fuel ratio of the exhaust gas which flows around the air-fuel ratio sensor becomes the rich air-fuel ratio, when the flow rate of the exhaust gas is small, the output air-fuel ratio becomes the lean air-fuel ratio even in an air-fuel ratio sensor where the element has cracked. Conversely, when the flow rate of the exhaust gas is large, in an air-fuel ratio sensor where the element has cracked, the output air-fuel ratio becomes the rich air-fuel ratio.

In this regard, due to the flow rate of the exhaust gas, the air-fuel ratio of the exhaust gas which flows around the air-fuel ratio sensor changes from the stoichiometric air-fuel ratio to the rich air-fuel ratio, then becomes the lean air-fuel ratio once, then changes to the rich air-fuel ratio in some cases. This state is shown in FIG. 9.

Figure 9:
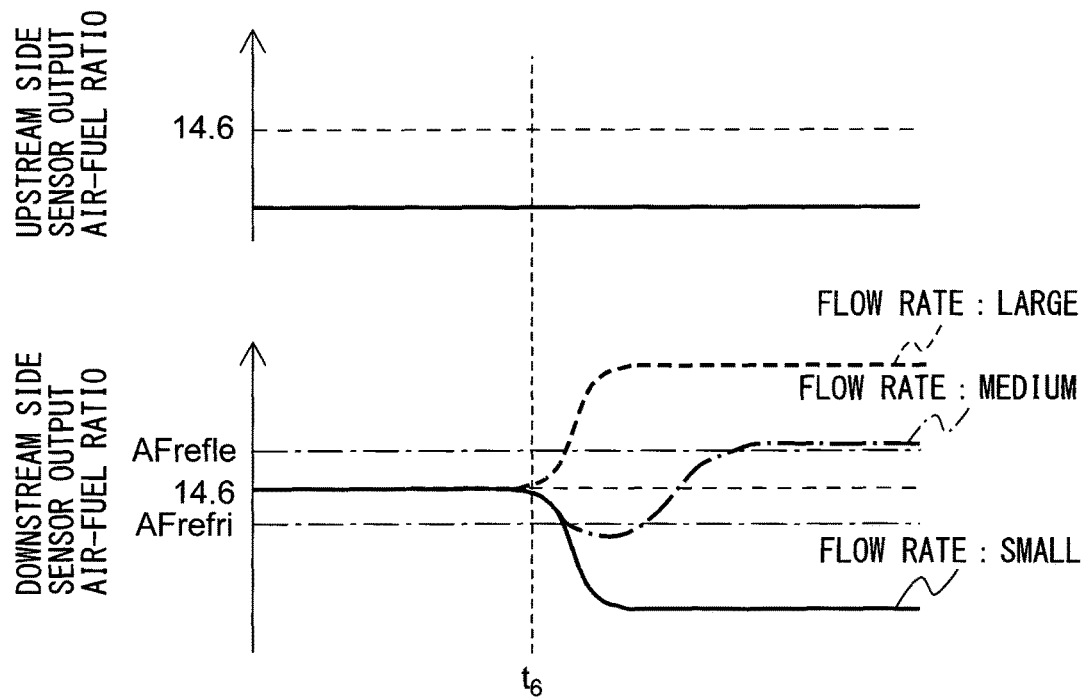
FIG. 9 is a time chart of output air-fuel ratios of individual air-fuel ratio sensors.

FIG. 9 is a time chart of the output air-fuel ratios of air-fuel ratio sensors in the case where the output air-fuel ratio of the upstream side air-fuel ratio sensor 40 is maintained constant at a rich air-fuel ratio. The output air-fuel ratio of the downstream side air-fuel ratio sensor 41 in FIG. 9 shows the case where the downstream side air-fuel ratio sensor 41 becomes abnormal due to a cracked element. The solid line in the figure shows the case where the flow rate of the exhaust gas which flows around the downstream side air-fuel ratio sensor 41 is small (for example, FIG. 8, $G_1$ or less), the broken line shows the case where it is large, and the one-dot chain line shows the case where it is the medium extent.

In the example which is shown in FIG. 9, the air-fuel ratio of the exhaust gas which flows into the upstream side exhaust purification catalyst 20 is also maintained constant at a rich air-fuel ratio. Further, in the example which is shown in FIG. 9, at the time $t_x$, the upstream side exhaust purification catalyst 20 becomes substantially zero in the stored amount of oxygen. Therefore, around the downstream side air-fuel ratio sensor 41, exhaust gas of substantially the stoichiometric air-fuel ratio circulates up to the time $t_x$. From the time $t_x$ on, rich air-fuel ratio exhaust gas flows.

As will be understood from FIG. 9, if the flow rate of exhaust gas is small, from the time $t_x$ on, the output air-fuel ratio of the downstream side air-fuel ratio sensor 41 becomes the rich air-fuel ratio. On the other hand, when the flow rate of the exhaust gas is large, the output current of the downstream side air-fuel ratio sensor 41 becomes the lean air-fuel ratio. As opposed to this, when the flow rate of the exhaust gas is a medium extent, the output current of the downstream side air-fuel ratio sensor 41 becomes the rich air-fuel ratio once, then changes to the lean air-fuel ratio.

Here, as explained above, the condition for active control, that is, the condition for diagnosis for abnormality of the downstream side air-fuel ratio sensor 41 is made the flow rate of exhaust gas being the lower limit flow rate or more. For this reason, when the flow rate of the exhaust gas is small and the output air-fuel ratio of the downstream side air-fuel ratio sensor 41 trends as shown in FIG. 9 by the solid line, the downstream side air-fuel ratio sensor 41 is not diagnosed for abnormality.

In this regard, when the flow rate of the exhaust gas is a medium extent, the output of the downstream side air-fuel ratio sensor 41 becomes a rich air-fuel ratio once, then changes to a lean air-fuel ratio. Here, in the example which is shown in FIG. 7, when the output air-fuel ratio of the downstream side air-fuel ratio sensor 41 changes to the rich judgment reference air-fuel ratio AFrefri or less, it is judged that the downstream side air-fuel ratio sensor 41 is normal. When performing judgment in this way, if the flow rate of the exhaust gas is the medium extent, even if a cracked element occurs in the downstream side air-fuel ratio sensor 41, it ends up being judged that the downstream side air-fuel ratio sensor 41 is normal. On the other hand, if not diagnosing abnormality of the downstream side air-fuel ratio sensor 41 even when the flow rate of the exhaust gas is the medium extent, the conditions enabling diagnosis of abnormality of the downstream side air-fuel ratio sensor 41 end up becoming extremely limited.

Therefore, in an embodiment of the present invention, due to active control, the target air-fuel ratio is made the active control air-fuel ratio. When the output air-fuel ratio of the upstream side air-fuel ratio sensor 40 becomes the rich air-fuel ratio, even if the output air-fuel ratio of the downstream side air-fuel ratio sensor 41 becomes an air-fuel ratio of the rich judgment reference air-fuel ratio AFrefri or less, the downstream side air-fuel ratio sensor 41 is not immediately judged to be normal.

Specifically, in the present embodiment, when the output air-fuel ratio of the upstream side air-fuel ratio sensor 40 becomes the rich air-fuel ratio and the output air-fuel ratio of the downstream side air-fuel ratio sensor 41 becomes the rich judgment reference air-fuel ratio or less, that time is counted by the time counter. Therefore, this time counter is counted up when the output air-fuel ratio of the downstream side air-fuel ratio sensor 41 is the rich judgment reference air-fuel ratio or less and is not counted up when it is leaner than the rich judgment reference air-fuel ratio. Further, when the value of the time counter which is counted in this way becomes a predetermined judgment value larger than zero or more, it is judged that the downstream side air-fuel ratio sensor 41 has become abnormal.

Figure 10:
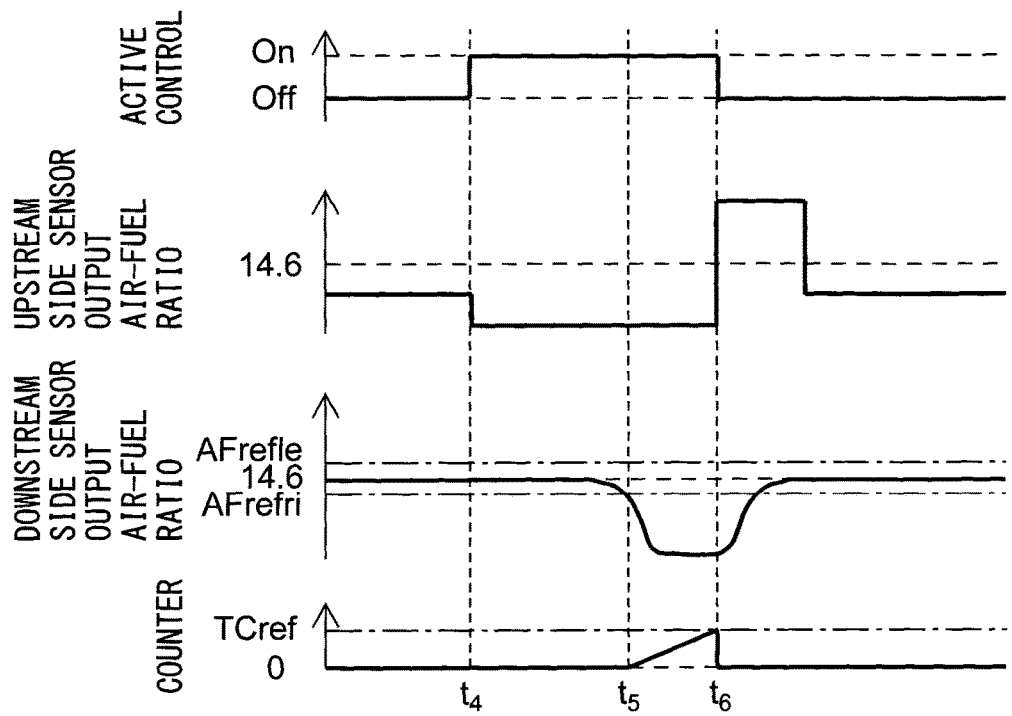
FIG. 10 is a time chart of output air-fuel ratios of individual air-fuel ratio sensors and a time counter.
Figure 10:
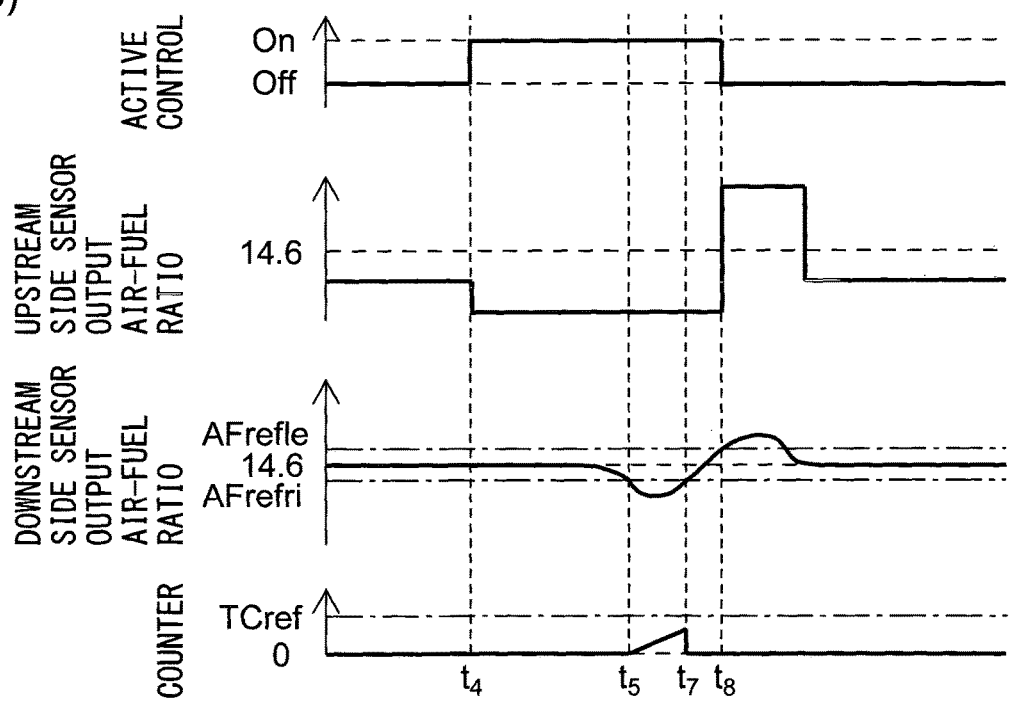

FIG. 10 is a time chart of the output air-fuel ratios of the air-fuel ratio sensors and the time counter. FIG. 10A shows the case where the downstream side air-fuel ratio sensor 41 is normal, while FIG. 10B shows the case where the downstream side air-fuel ratio sensor 41 has become abnormal due to a cracked element. Further, in each case, the case is shown where the flow rate of the exhaust gas which flows around the downstream side air-fuel ratio sensor 41 becomes a medium extent.

In the example which is shown in FIG. 10A, at the time $t_4$, active control is started. Before the time $t_5$, the stored amount of oxygen of the upstream side exhaust purification catalyst 20 becomes substantially zero and rich air-fuel ratio exhaust gas flows out from the upstream side exhaust purification catalyst 20. As a result, at the time $t_5$, the output air-fuel ratio of the downstream side air-fuel ratio sensor 41 becomes the rich judgment reference air-fuel ratio AFrefri or less and the time counter starts the count. After this, the output air-fuel ratio of the downstream side air-fuel ratio sensor 41 is maintained at the rich judgment air-fuel ratio AFrefri or more, so the time counter increases. As a result, at the time $t_6$, the value of the time counter reaches the judgment value TCref and the downstream side air-fuel ratio sensor 41 is judged to be normal. In the example which is shown in FIG. 10A, at the time $t_6$ on, active control is made to stop and normal operation is started.

On the other hand, in the example which is shown in FIG. 10B as well, at the time $t_5$, the output air-fuel ratio of the downstream side air-fuel ratio sensor 41 becomes the rich judgment air-fuel ratio AFrefri or less and the time counter starts the count. However, in the example which is shown in FIG. 10B, before the value of the time counter reaches the judgment value TCref, at the time $t_7$, the output air-fuel ratio of the downstream side air-fuel ratio sensor 41 becomes the rich judgment air-fuel ratio AFrefri or more. For this reason, at the time $t_7$ on, the count by the time counter is stopped. After this, at the time $t_8$, the output air-fuel ratio of the downstream side air-fuel ratio sensor 41 becomes the lean judgment reference air-fuel ratio AFrefle or more and it is judged that the downstream side air-fuel ratio sensor 41 has become abnormal. In the example which is shown in FIG. 10B, at the time $t_8$ on, active control is made to stop and normal operation is started.

In this way, in the present embodiment, the downstream side air-fuel ratio sensor 41 is not judged normal immediately after the output air-fuel ratio becomes the rich judgment reference air-fuel ratio AFrefri or less. It is first judged normal when it becomes the rich judgment reference air-fuel ratio AFrefri or less over a certain extent of time period. Due to this, it becomes possible to accurately diagnose abnormality of the downstream side air-fuel ratio sensor 41.

Note that, when the downstream side air-fuel ratio sensor 41 becomes abnormal due to a cracked element, the time during which the output air-fuel ratio becomes the rich judgment air-fuel ratio AFrefri or less changes according to the flow rate of the exhaust gas. The judgment value TCref at the time counter is made the longest time in this. This judgment value is determined in accordance with the type of the air-fuel ratio sensor which is used, the amount of exhaust of the internal combustion engine, etc.

Note that, in the above embodiment, the downstream side air-fuel ratio sensor 41 is judged normal when the time during which the output air-fuel ratio becomes the rich judgment reference air-fuel ratio AFrefri or less becomes a predetermined time or more, but it is also possible to use another parameter rather than time. For example, it may also be judged normal while the output air-fuel ratio of the downstream side air-fuel ratio sensor 41 is the rich judgment reference air-fuel ratio AFrefri or less when the cumulative value of the flow rate of the exhaust gas which flows around the downstream side air-fuel ratio sensor 41 is a predetermined judgment value or more. In this case, for example, an air flow meter 39 etc. is used to detect or estimate the flow rate of the exhaust gas which flows around the downstream side air-fuel ratio sensor 41.

<Flow Chart>

Figure 11:
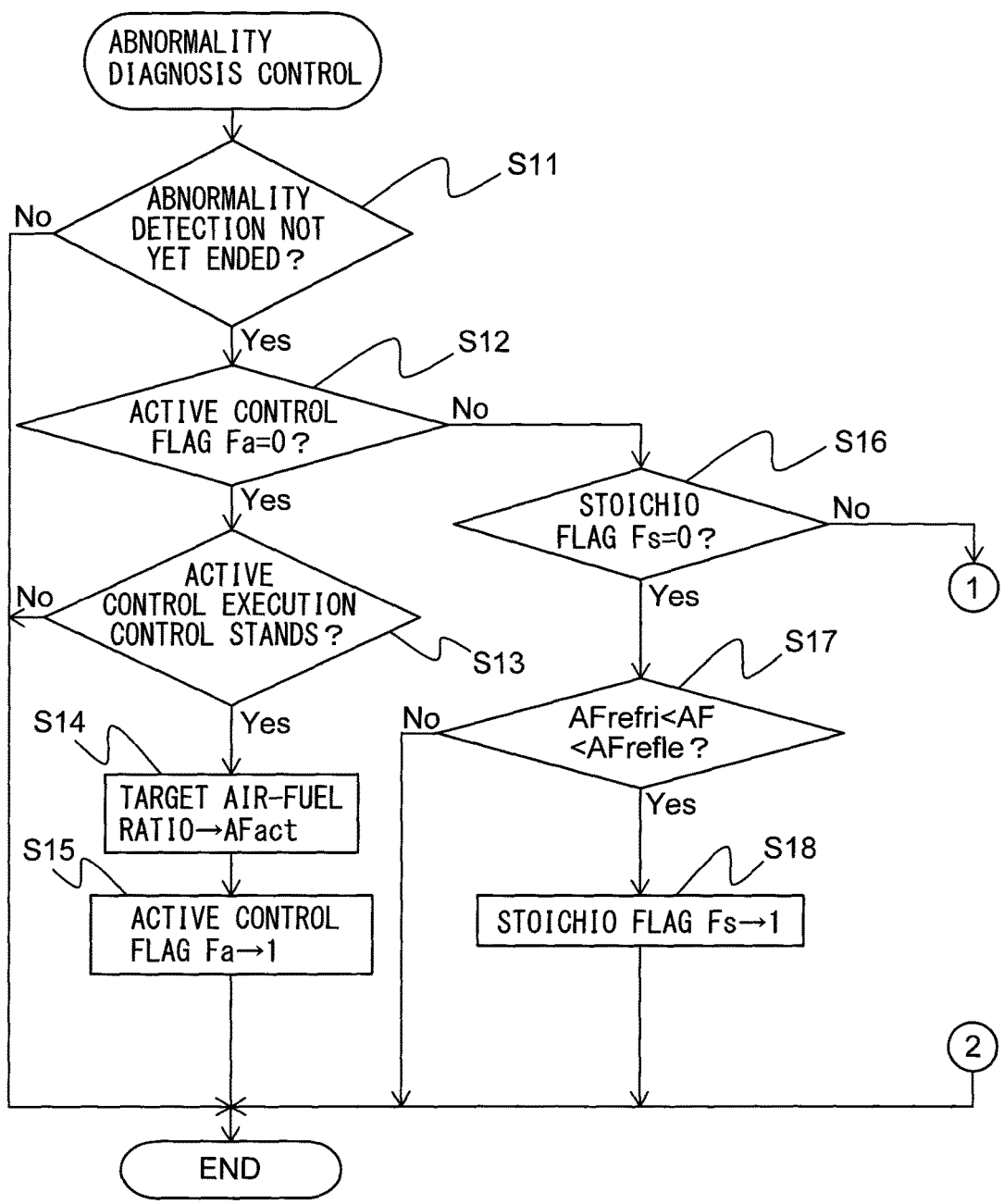
FIG. 11 is a flow chart which shows part of a control routine of abnormality diagnosis control of a downstream side air-fuel ratio sensor.
Figure 12:
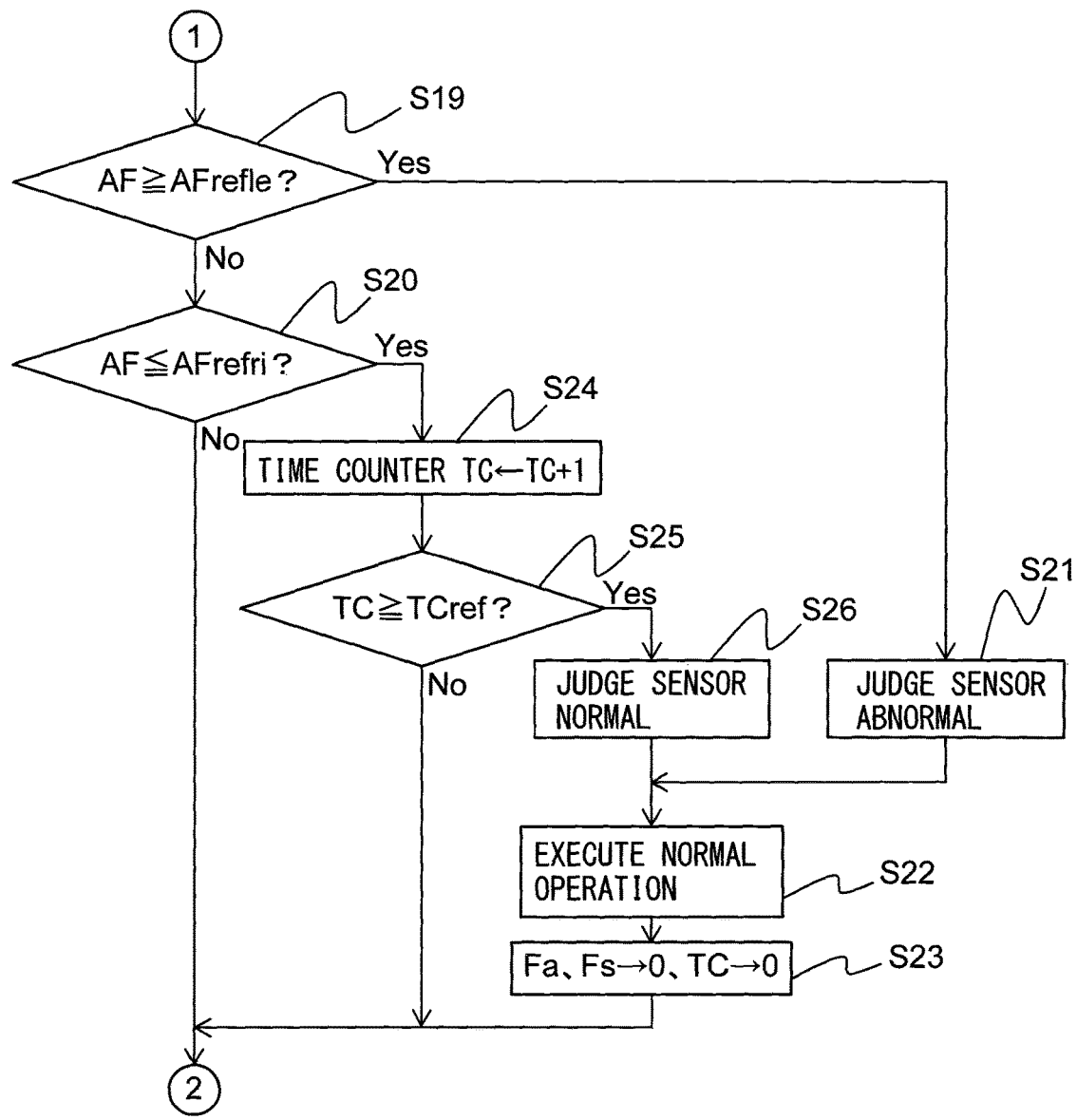
FIG. 12 is a flow chart which shows part of a control routine of abnormality diagnosis control of a downstream side air-fuel ratio sensor.

FIG. 11 and FIG. 12 are flow charts which show the control routine of abnormality diagnosis control of the downstream side air-fuel ratio sensor 41. The illustrated control routine is performed by interruption every certain time interval.

First, at step S11, after the internal combustion engine is started or after the ignition key of the vehicle which mounts the internal combustion engine is turned on, it is judged that judgment of abnormality of the downstream side air-fuel ratio sensor 41 is incomplete. If, after the start of internal combustion engine, judgment of abnormality is already performed, the control routine is made to end. On the other hand, when it is judged that the judgment of abnormality has not yet ended, the routine proceeds to step S12. At step S12, it is judged if the active control flag Fa is 0. The active control flag Fa is a flag which is made 1 when active control is executed and is made 0 at other times. When active control has not yet been executed, the routine proceeds to step S13.

At step S13, it is judged if the conditions for active control stand. If the above-mentioned conditions for active control do not stand, the control routine is made to end. On the other hand, if the conditions for active control stand, the routine proceeds to step S14 where the target air-fuel ratio is set to the air-fuel ratio at the time of active control. Next, at step S15, the active control flag Fa is set to 1, and the control routine is made to end.

At the next control routine, active control flag Fa is set to 1, so the routine proceeds from step S12 to step S16. At step S16, it is judged if the stoichiometric flag Fs is 0. The stoichiometric flag Fs is a flag which is made 1 after the start of active control when the output air-fuel ratio of the downstream side air-fuel ratio sensor 41 once reaches substantially the stoichiometric air-fuel ratio and which is made "0" otherwise. When at step S16 the stoichiometric flag Fs is 0, the routine proceeds to step S17. At step S17, it is judged if the output air-fuel ratio of the downstream side air-fuel ratio sensor 41 is an air-fuel ratio between the rich judgment reference air-fuel ratio AFrefri and the lean judgment reference air-fuel ratio AFrefle, that is, if it has substantially converged to the stoichiometric air-fuel ratio. At step S17, if it is judged that the output air-fuel ratio of the downstream side air-fuel ratio sensor 41 has not converged to the stoichiometric air-fuel ratio, the control routine is made to end. On the other hand, when it is judged at step S17 that the output air-fuel ratio of the downstream side air-fuel ratio sensor 41 has converged to the stoichiometric air-fuel ratio, the routine proceeds to step S18. At step S18, the stoichiometric flag Fs is set to 1, and the control routine is made to end.

At the next control routine, the stoichiometric flag Fs is set to 1, so the routine proceeds from step S16 to step S19 and S20. At step S19, it is judged if the output air-fuel ratio of the downstream side air-fuel ratio sensor 41 is the lean judgment reference air-fuel ratio AFrefle or more. At step S20, it is judged if the output air-fuel ratio of the downstream side air-fuel ratio sensor 41 is the rich judgment reference air-fuel ratio AFrefri or less. When it is judged at step S19 and S20 that the output air-fuel ratio of the downstream side air-fuel ratio sensor 41 is an air-fuel ratio between the rich judgment reference air-fuel ratio AFrefri and the lean judgment reference air-fuel ratio AFrefle, the control routine is made to end.

On the other hand, when it is judged at step S19 that the output air-fuel ratio is the lean judgment reference air-fuel ratio AFrefle or more, the routine proceeds to step S21. At step S21, it is judged that the downstream side air-fuel ratio sensor 41 has become abnormal. Due to this, for example, an alarm lamp of a vehicle which mounts the internal combustion engine is made to light up. After this, at step S22, the target air-fuel ratio is released from being set to the air-fuel ratio at the time of active control and normal operation is started. Next, at step S23, the active control flag Fa and the stoichiometric flag Fs are reset to 0. the time counter TC is reset to 0, and the control routine is made to end.

On the other hand, when it is judged at step S20 that the output air-fuel ratio is the rich judgment reference air-fuel ratio AFrefri or less, the routine proceeds to step S2. At step S24, the previous value of the time counter TC plus 1 is made the new value of the time counter TC. Next, at step S25, it is judged if the value of the time counter TC is the judgment value TCref or more. When it is judged that the value is smaller than the judgment value TCref, the control routine is made to end. On the other hand, when it is judged at step S25 that the value of the time counter TC is the judgment value TCref or more, the routine proceeds to step S26. At step S26, it is judged that the downstream side air-fuel ratio sensor 41 is normal, then the routine proceeds to step S22.

Second Embodiment

Next, referring to FIG. 13 and FIG. 14, an abnormality diagnosis system of a second embodiment of the present invention will be explained. The configuration etc. of the abnormality diagnosis system of the second embodiment of the present invention are basically similar to the configuration etc. of the abnormality diagnosis system of the first embodiment. However, in the first embodiment, the count up amount of the counter was constant, while in the present embodiment, the count up amount of the counter is made to change in accordance with the output air-fuel ratio of the downstream side air-fuel ratio sensor 41.

In this regard, as shown in FIG. 9, if the downstream side air-fuel ratio sensor 41 becomes abnormal due to a cracked element and the output air-fuel ratio once becomes the rich air-fuel ratio, the rich degree is relatively small. As opposed to this, if the downstream side air-fuel ratio sensor 41 is normal, the output air-fuel ratio trends in the same way as the case where the flow rate of the exhaust gas is small such as shown by the solid line in FIG. 9. Therefore, the rich degree is relatively large.

Therefore, in the present embodiment, during active control, the count up amount of the time counter when the output air-fuel ratio of the downstream side air-fuel ratio sensor 41 becomes the rich judgment air-fuel ratio AFrefri or less is changed in accordance with the rich degree. Specifically, the larger the rich degree when the output air-fuel ratio of the downstream side air-fuel ratio sensor 41 becomes the rich judgment air-fuel ratio AFrefri or less, the larger the count up amount of the time counter is made.

Figure 13:
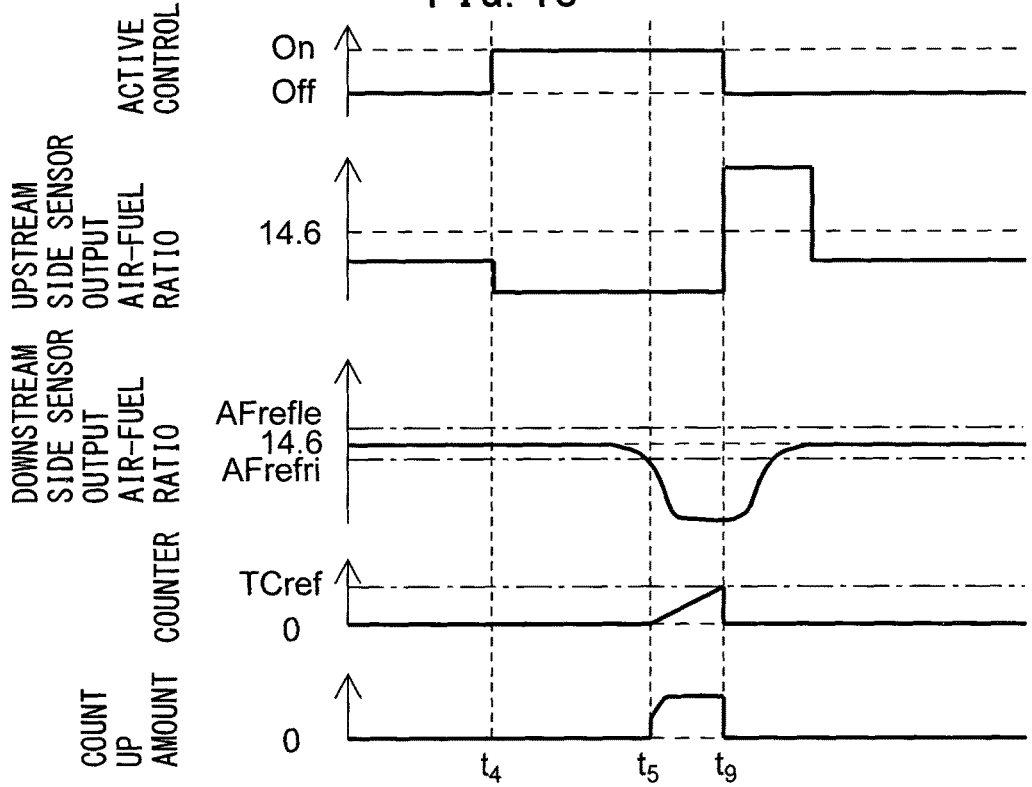
FIG. 13 is a time chart of output air-fuel ratios of individual air-fuel ratio sensors, a time counter, and a count up amount.
Figure 13:
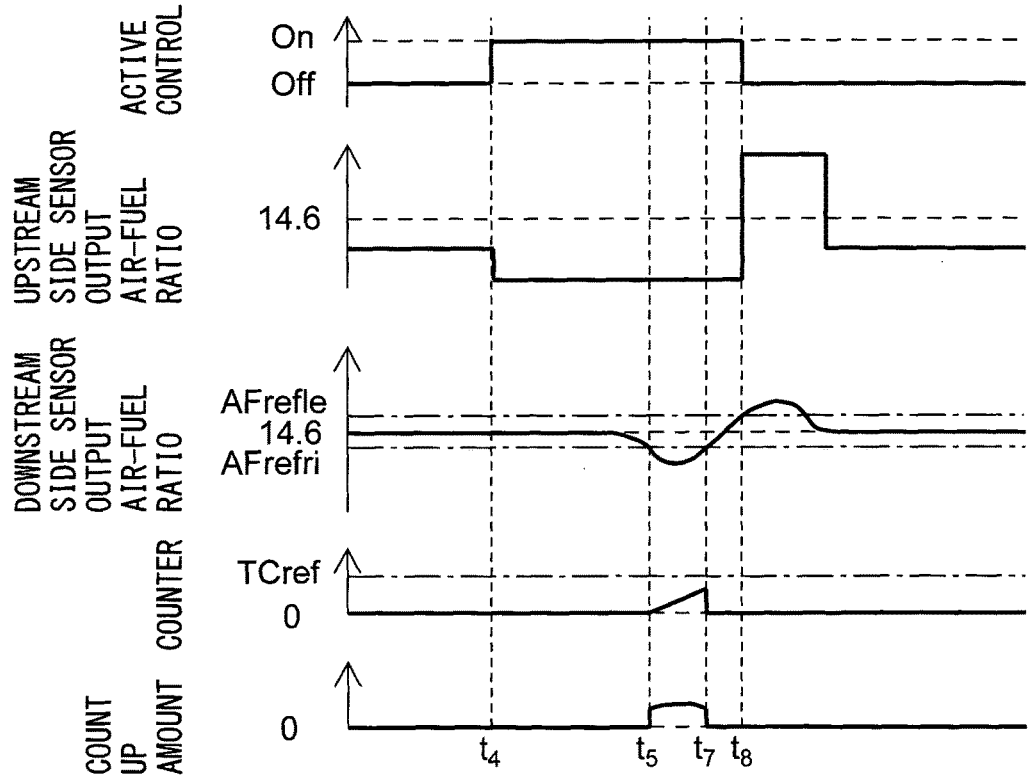

FIG. 13 is a time chart of the output air-fuel ratios of the air-fuel ratio sensors, time counter, and count up amount and is a view similar to FIG. 10. FIG. 13A shows the case where the downstream side air-fuel ratio sensor 41 is normal, while FIG. 13B shows the case where the downstream side air-fuel ratio sensor 41 becomes abnormal due to a cracked element. Further, in each case, the case is shown where the flow rate of the exhaust gas which flows around the downstream side air-fuel ratio sensor 41 becomes a medium extent.

In the example which is shown in FIG. 13A, at the time $t_5$, the output air-fuel ratio of the downstream side air-fuel ratio sensor 41 becomes the rich judgment air-fuel ratio AFrefri or less and the time counter starts the count. At this time, the count up amount of the time counter becomes larger the larger the difference of the output air-fuel ratio of the downstream side air-fuel ratio sensor 41 from the rich judgment air-fuel ratio AFrefri. As shown in FIG. 13A, the rich degree at the output air-fuel ratio of the downstream side air-fuel ratio sensor 41 from time $t_5$ on is large, so the count up amount becomes large. Due to this, the count up speed of the time counter becomes faster. At the time $t_9$ earlier than the time $t_6$ of FIG. 10, the value of the time counter reaches the judgment value TCref and it is judged that the downstream side air-fuel ratio sensor 41 is normal.

On the other hand, in the example which is shown in FIG. 13B, at the time $t_5$, the time counter starts the count. However, the rich degree at the output air-fuel ratio of the downstream side air-fuel ratio sensor 41 at the time $t_5$ on is small, so the count up amount becomes small. Due to this, the count up speed of the time counter becomes slower. As a result, until the output air-fuel ratio of the downstream side air-fuel ratio sensor 41 reaches the rich judgment air-fuel ratio AFrefri or more (time $t_7$), the time counter does not reach the judgment value TCref and mistaken judgment that the downstream side air-fuel ratio sensor 41 is normal is suppressed.

In this way, by changing the count up amount in accordance with the rich degree of the output air-fuel ratio of the downstream side air-fuel ratio sensor 41, the count up amount of the time counter becomes faster when the downstream side air-fuel ratio sensor 41 is normal. For this reason, it is possible to quickly judge normality of the downstream side air-fuel ratio sensor 41.

Note that, in the above embodiment, the count up amount is changed in accordance with the rich degree of the output air-fuel ratio of the downstream side air-fuel ratio sensor 41. However, it is also possible to change the judgment value TCref of the time counter in accordance with the rich degree of the output air-fuel ratio of the downstream side air-fuel ratio sensor 41. In this case, the judgment value TCref may be changed so that the larger the rich degree when the output air-fuel ratio of the downstream side air-fuel ratio sensor 41 becomes the rich judgment air-fuel ratio AFrefri or less, the smaller the judgment value TCref becomes.

Further, as the parameter at the time of normality judgment, similar control is possible when using a parameter other than time as well. For example, when judging normality based on the cumulative value of the exhaust gas while the output air-fuel ratio of the downstream side air-fuel ratio sensor 41 is the rich judgment reference air-fuel ratio AFrefri or less, the judgment value is changed in accordance with the rich degree when the output air-fuel ratio of the downstream side air-fuel ratio sensor 41 becomes the rich judgment reference air-fuel ratio AFrefri or less.

Figure 14:
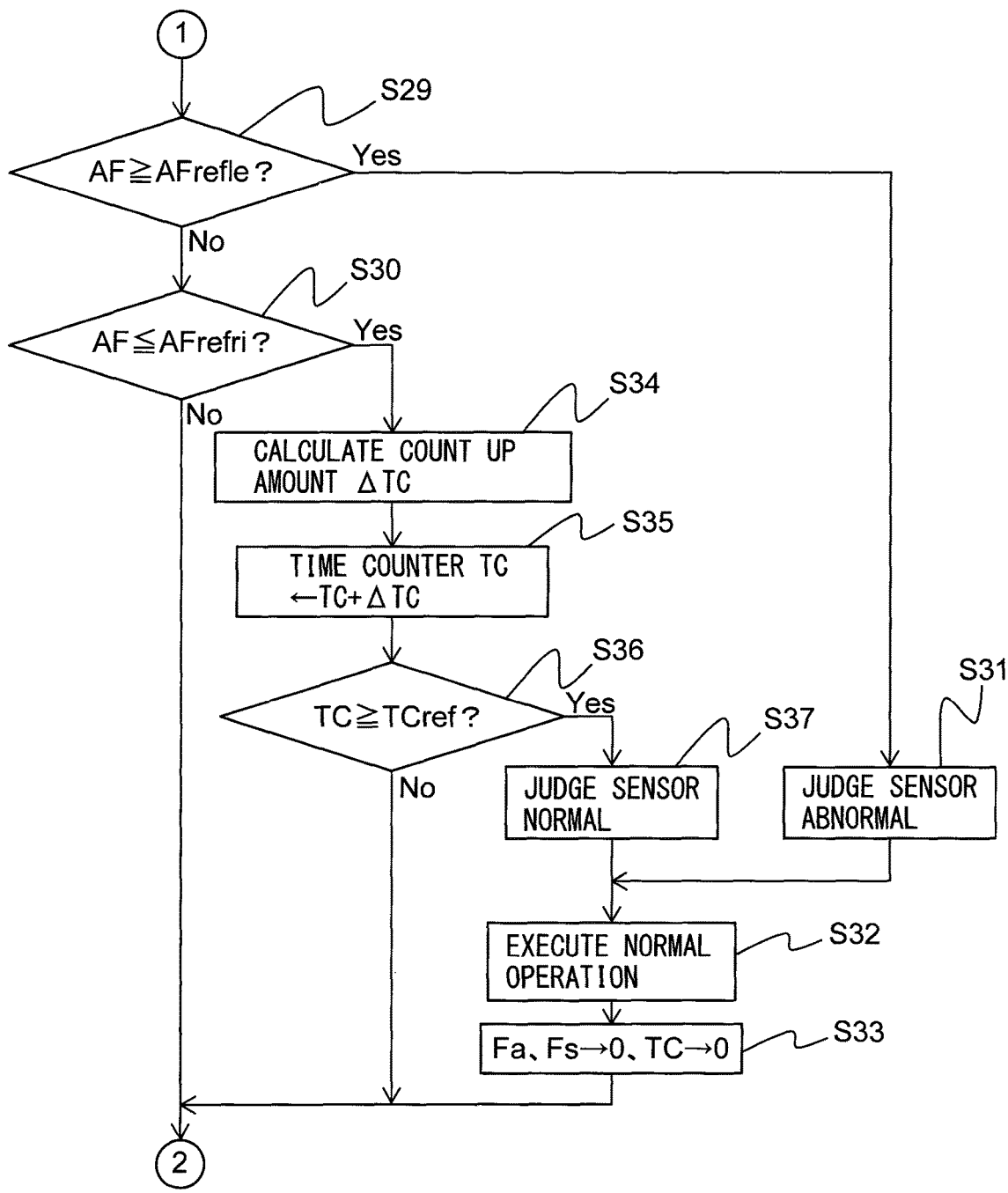
FIG. 14 is a flow chart which shows part of a control routine of abnormality diagnosis control of a downstream side air-fuel ratio sensor in a second embodiment.

FIG. 14 is a flow chart which shows part of the control routine of the abnormality diagnosis routine of the downstream side air-fuel ratio sensor 41 in the present embodiment. The flow chart which is shown in FIG. 14 is used instead of the flow chart which is shown in FIG. 12. Therefore, in the control routine in the present embodiment, the control routines which are shown in FIG. 11 and FIG. 14 are executed.

Steps S29 to S33 of FIG. 14 are similar to steps S19 to S23 of FIG. 12, so explanations will be omitted. When it is judged at step S30 that the output air-fuel ratio is the rich judgment air-fuel ratio AFrefri or less, the routine proceeds to step S34. At step S34, the rich degree of the output air-fuel ratio of the downstream side air-fuel ratio sensor 41 is used as the basis to calculate the count up amount ΔTC at the time counter. The relationship between the rich degree and the count up amount ΔTC is stored as a map or as a calculation formula in the ROM 31 of the ECU 31. Next, at step S35, the previous value of the time counter TC plus the count up amount ΔTC which was calculated at step S34 is made the new value of the time counter TC. Next, at step S36, it is judged if the value of the time counter TC is the judgment value TCref or more. When it is judged at step S36 that the value of the time counter TC is smaller than the judgment value TCref, the control routine is made to end. On the other hand, when it judged at step S36 that the value of the time counter TC is the judgment value TCref or more, the routine proceeds to step S37. At step S37, it is judged that the downstream side air-fuel ratio sensor 41 is normal and the routine proceeds to step S32.

Third Embodiment

Next, referring to FIG. 15 and FIG. 16, the abnormality diagnosis system of the third embodiment of the present invention will be explained. The configuration etc. of the abnormality diagnosis system of the third embodiment of the present invention are basically similar to the configuration etc. of the abnormality diagnosis system of the first embodiment or second embodiment.

In this regard, as shown in FIG. 9, if the downstream side air-fuel ratio sensor 41 becomes abnormal due to a cracked element and the output air-fuel ratio becomes the rich air-fuel ratio once, the minimum value is relatively large (that is, the maximum value of the rich degree is small). As opposed to this, when the downstream side air-fuel ratio sensor 41 is normal, the output air-fuel ratio trends in the same way as when the flow rate of exhaust gas is small such as shown by the solid line in FIG. 9. Therefore, the minimum value is relatively small (that is, the maximum value of the rich degree is large).

Therefore, in the present embodiment, during active control, when the output air-fuel ratio of the downstream side air-fuel ratio sensor 41 becomes a normality judgment reference air-fuel ratio AFnor (for example, 14) richer than the rich judgment air-fuel ratio AFrefri or less, it is judged that the downstream side air-fuel ratio sensor 41 is normal even if the value of the time counter is less than the judgment value TCref. Note that, the output air-fuel ratio of the downstream side air-fuel ratio sensor 41 varies with respect to the actual air-fuel ratio due to manufacturing error etc. The normality judgment reference air-fuel ratio AFnor is made a rich air-fuel ratio which the output air-fuel ratio cannot reach when the downstream side air-fuel ratio sensor 41 becomes abnormal due to a cracked element even if considering such variation.

Figure 15:
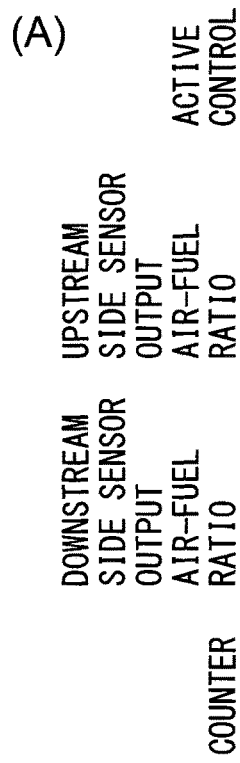
FIG. 15 is a time chart of output air-fuel ratios of individual air-fuel ratio sensors and a time counter.
Figure 15:
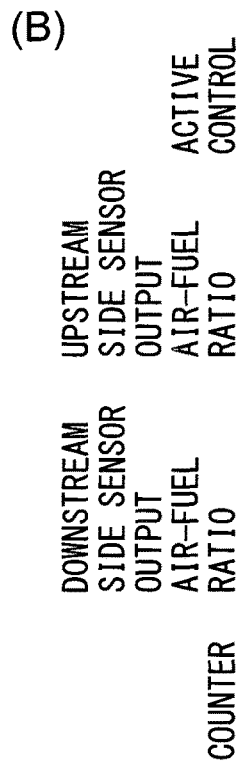

FIG. 15 is a time chart of the output air-fuel ratios of the air-fuel ratio sensors and the time counter and is a view similar to FIG. 10. FIG. 15A shows the case where the downstream side air-fuel ratio sensor 41 is normal, while FIG. 15B shows the case of the downstream side air-fuel ratio sensor 41 becoming abnormal due to a cracked element. Further, in each case, the case is shown where the flow rate of the exhaust gas which flows around the downstream side air-fuel ratio sensor 41 becomes a medium extent.

In the example which is shown in FIG. 15A, at the time $t_5$, the output air-fuel ratio of the downstream side air-fuel ratio sensor 41 becomes the rich judgment air-fuel ratio AFrefri or less and the time counter starts the count. After this, as shown in FIG. 15A, the output air-fuel ratio of the downstream side air-fuel ratio sensor 41 rapidly falls and at the time $t_{10}$ reaches the normality judgment reference air-fuel ratio AFnor. In the present embodiment, when the output air-fuel ratio of the downstream side air-fuel ratio sensor 41 becomes the normality judgment reference air-fuel ratio AFnor or less, the sensor is judged normal, so at the time $t_{10}$, it is judged that the downstream side air-fuel ratio sensor 41 is normal. For this reason, in the present embodiment, before the time counter reaches the judgment value TCref, the downstream side air-fuel ratio sensor 41 is judged normal.

On the other hand, in the example which is shown in FIG. 15B, at the time $t_5$, the time counter starts the count. However, from the time $t_5$on, the output air-fuel ratio of the downstream side air-fuel ratio sensor 41 does not fall that much, so the normality judgment reference air-fuel ratio AFnor is not reached. In addition, in the example which is shown in FIG. 15B, the time counter does not reach the judgment value TCref until the output air-fuel ratio of the downstream side air-fuel ratio sensor 41 becomes larger than the rich judgment air-fuel ratio AFrefri (time $t_7$). As a result, at time $t_8$, the output air-fuel ratio of the downstream side air-fuel ratio sensor 41 becomes the lean judgment reference air-fuel ratio AFrefle or more and the downstream side air-fuel ratio sensor 41 is judged abnormal.

In this way, in the present embodiment, when the output air-fuel ratio of the downstream side air-fuel ratio sensor 41 reaches the normality judgment reference air-fuel ratio AFnor, the downstream side air-fuel ratio sensor 41 is immediately judged normal. For this reason, the downstream side air-fuel ratio sensor 41 can be quickly judged normal.

Note that, as the parameter when judging normality, similar control is possible even when using a parameter other than time. For example, when judging normality based on the cumulative value of the flow rate of the exhaust gas while the output air-fuel ratio of the downstream side air-fuel ratio sensor 41 becomes the rich judgment reference air-fuel ratio AFrefri or less, it may be judged that the downstream side air-fuel ratio sensor 41 is normal even when the cumulative value of the exhaust gas flow rate is less than the judgment value when the output air-fuel ratio of the downstream side air-fuel ratio sensor 41 becomes the normality judgment reference air-fuel ratio AFnor or less.

Figure 16:
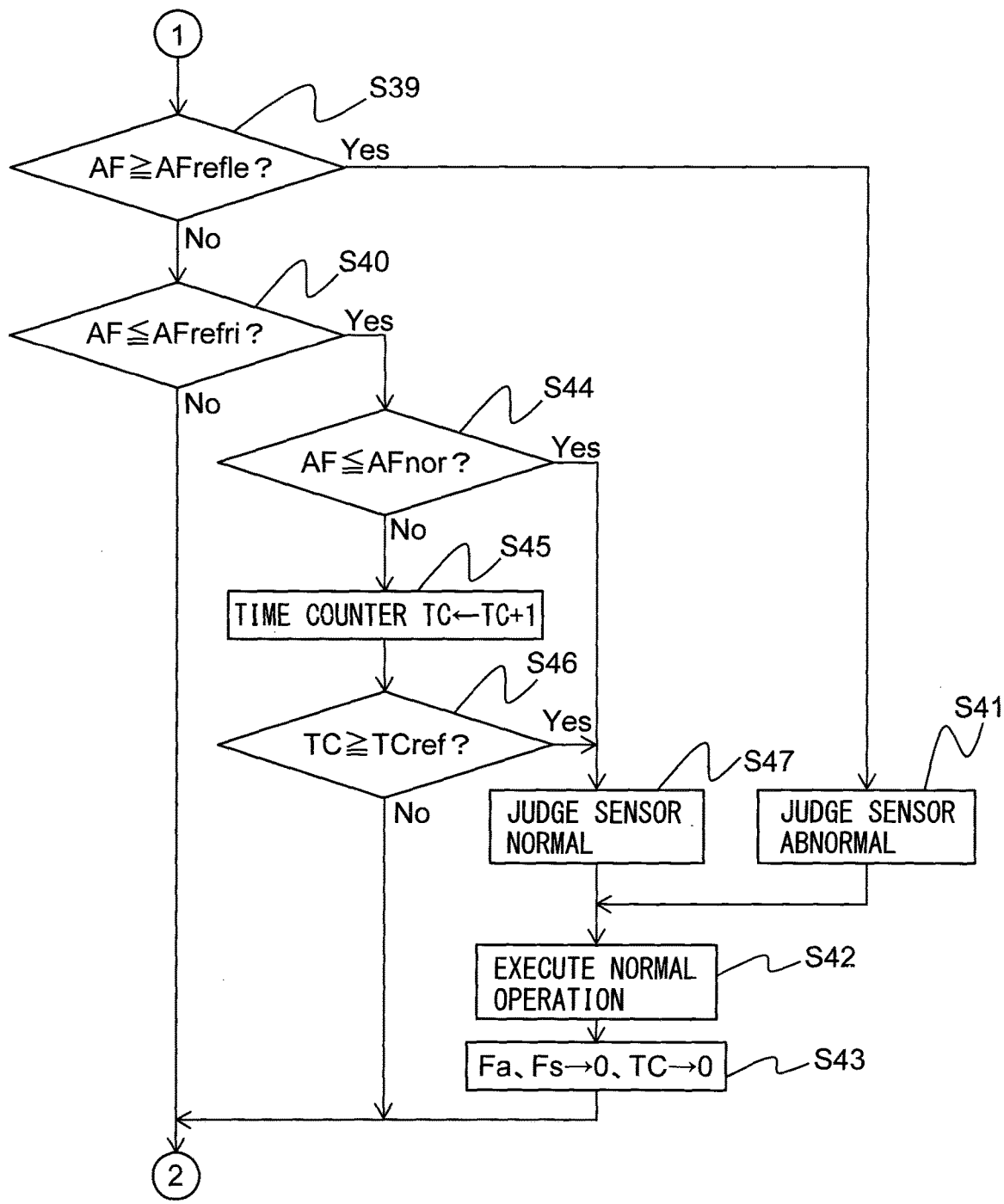
FIG. 16 is a flow chart which shows part of a control routine of abnormality diagnosis control of a downstream side air-fuel ratio sensor in a third embodiment.

FIG. 16 is a flow chart which shows part of the control routine of abnormality diagnosis control of the downstream side air-fuel ratio sensor 41 in the present embodiment. The flow chart which is shown in FIG. 16 is used instead of the flow chart which is shown in FIG. 12. Therefore, in the control routine in the present embodiment, the control routines which are shown in FIG. 11 and FIG. 16 are executed.

Steps S39 to S43 of FIG. 16 are similar to steps S19 to S23 of FIG. 12, so explanations will be omitted. When it is judged at step S40 that the output air-fuel ratio is the rich judgment air-fuel ratio AFrefri or less, the routine proceeds to step S44. At step S44, it is judged if the output air-fuel ratio of the downstream side air-fuel ratio sensor 41 is the normality judgment reference air-fuel ratio AFnor or less. If it is judged that the output air-fuel ratio of the downstream side air-fuel ratio sensor 41 is the normality judgment reference air-fuel ratio AFnor or less, the routine proceeds to step S47. At step S47, it is judged that the downstream side air-fuel ratio sensor 41 is normal and the routine proceeds to step S42. On the other hand, when it is judged at step S44 that the output air-fuel ratio of the downstream side air-fuel ratio sensor 41 is not the normality judgment reference air-fuel ratio AFnor or less, the routine proceeds to step S45. At step S45, the previous value of the time counter TC plus 1 is made the new value of the time counter TC. Next, at step S46, it is judged if the value of the time counter TC is the judgment value TCref or more. If it is judged at step S46 that the value of the time counter TC is smaller than the judgment value TCref, the control routine is made to end. On the other hand, at step S46, when it is judged that the value of the time counter TC is the judgment value TCref or more, the routine proceeds to step S47. At step S47, it is judged that the downstream side air-fuel ratio sensor 41 is normal, then the routine proceeds to step S42.

Fourth Embodiment

Figure 17:
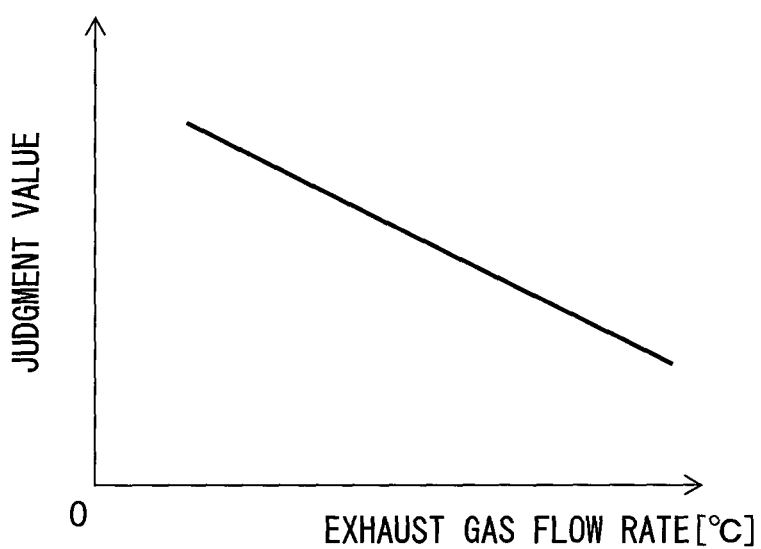
FIG. 17 is a view which shows the relationship between a flow rate of exhaust gas and a judgment value of a time counter.

Next, referring to FIG. 17 and FIG. 18, the abnormality diagnosis system of a fourth embodiment of the present invention will be explained. The configuration of the abnormality diagnosis system of the fourth embodiment of the present invention etc. are basically similar to the configuration of the abnormality diagnosis system of the first embodiment to third embodiment.

In this regard, as shown in FIG. 9, in a downstream side air-fuel ratio sensor 41 which becomes abnormal due to a cracked element, the output air-fuel ratio changes in accordance with the flow rate of the exhaust gas. The greater the flow rate of the exhaust gas, the smaller the rich degree when the output air-fuel ratio of the downstream side air-fuel ratio sensor 41 once becomes a rich air-fuel ratio. For this reason, the greater the flow rate of exhaust gas at the time of performing active control, the shorter the time when the output air-fuel ratio becomes the rich judgment air-fuel ratio AFrefri or less even when the downstream side air-fuel ratio sensor 41 becomes abnormal due to a cracked element.

Therefore, in the present embodiment, the air flow meter 39 etc. is used to detect or estimate the flow rate of the exhaust gas which flows around the downstream side air-fuel ratio sensor 41 and the judgment value TCref of the time counter is changed in accordance with the detected or estimated flow rate of the exhaust gas. In more detail, in the present embodiment, as shown in FIG. 17, the judgment value TCref is changed so that the larger the flow rate of the exhaust gas when the output air-fuel ratio of the downstream side air-fuel ratio sensor 41 becomes the rich judgment air-fuel ratio AFrefri or less, the smaller the judgment value TCref.

According to the present embodiment, by changing the judgment value TCref of the time counter in accordance with the flow rate of the exhaust gas in this way, it is possible to quickly judge the sensor is normal when the downstream side air-fuel ratio sensor 41 is normal.

Figure 18:
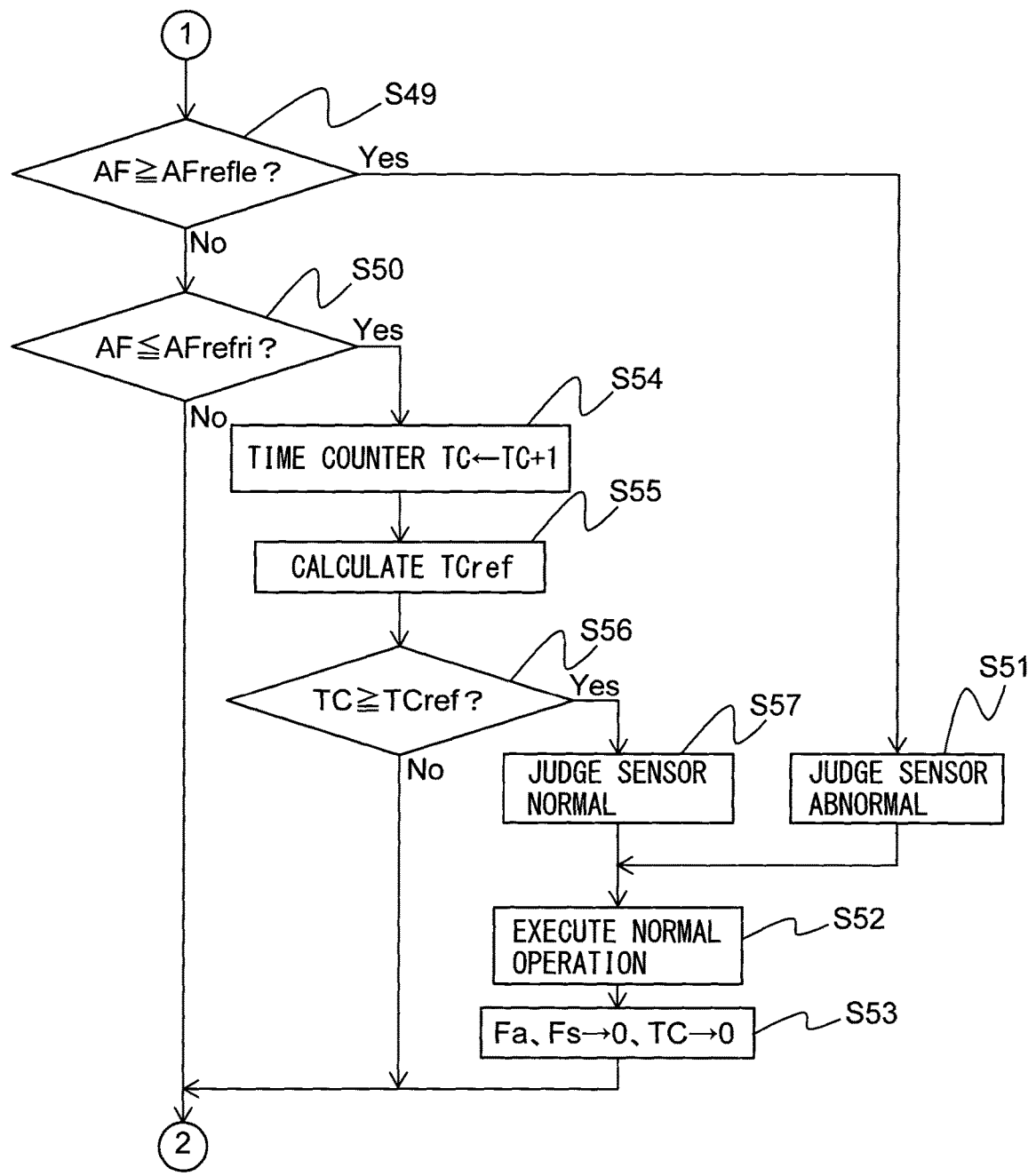
FIG. 18 is a flow chart which shows part of a control routine of abnormality diagnosis control of a downstream side air-fuel ratio sensor in a fourth embodiment.

FIG. 18 is a flow chart which shows part of the control routine of abnormality diagnosis control of the downstream side air-fuel ratio sensor 41 in the present embodiment. The flow chart which is shown in FIG. 18 is used instead of the flow chart which is shown in FIG. 12. Therefore, in the control routine in the present embodiment, the control routines which are shown in FIG. 11 and FIG. 18 are executed.

Steps S49 to S54, S56, and S57 of FIG. 18 are similar to steps S19 to S26 of FIG. 12, so explanations are omitted. At step S54, if the previous value of the time counter TC plus 1 is made the new value of the time counter TC, the routine proceeds to step S55. At step S55, the flow rate of the exhaust gas which flows around the downstream side air-fuel ratio sensor 41, which is estimated based on the output of the air flow meter 39 etc., is used as the basis to calculate the judgment value TCref using the map such as shown in FIG. 17. Next, at step S56, it is judged if the value of the time counter TC is judgment value TCref which is calculated at step S55 or more.

Fifth Embodiment

Next, referring to FIG. 19, an abnormality diagnosis system of a fifth embodiment of the present invention will be explained. The configuration etc. of the abnormality diagnosis system of the fifth embodiment of the present invention are basically similar to the configuration etc. of the abnormality diagnosis system of the first embodiment to the fourth embodiment.

In this regard, as shown in the first embodiment to the fifth embodiment, when judging normality and judging abnormality of the downstream side air-fuel ratio sensor 41, sometimes the downstream side air-fuel ratio sensor 41 will not be judged normal or judged abnormal. For example, in the case of the first embodiment, when the output air-fuel ratio of the downstream side air-fuel ratio sensor 41 is maintained at a rich air-fuel ratio which is very slightly richer than the stoichiometric air-fuel ratio or a lean air-fuel ratio which is very slightly leaner than the stoichiometric air-fuel ratio, the downstream side air-fuel ratio sensor 41 is not judged normal or abnormal. However, as explained above, in active control, the air-fuel ratio of the exhaust gas which flows into the upstream side exhaust purification catalyst 20 is maintained at the rich air-fuel ratio, so if this state continues over a long time period, there is a possibility of deterioration of the exhaust emission being invited.

Therefore, in the present embodiment, active control is suspended when the downstream side air-fuel ratio sensor 41 has not been judged normal or judged abnormal for a long time period from when active control is started.

Specifically, in the present embodiment, the amount of oxygen which is insufficient when trying to make the air-fuel ratio of the exhaust gas which flows into the upstream side exhaust purification catalyst 20 the stoichiometric air-fuel ratio is calculated as the oxygen shortage. This oxygen shortage is calculated based on the output air-fuel ratio of the upstream side air-fuel ratio sensor 40 and the output of the air flow meter 39 etc. The higher the rich degree in the output air-fuel ratio of the upstream side air-fuel ratio sensor 40, the greater the oxygen shortage which is calculated. Further, the greater the flow rate of the air which flows into the upstream side exhaust purification catalyst 20 which is calculated based on the output of the air flow meter 39 etc., the greater the oxygen shortage which is calculated.

Further, in the present embodiment, before either judgment of normality or judgment of abnormality of the downstream side air-fuel ratio sensor 41, active control is suspended when the cumulative value of the oxygen shortage from the start of active control becomes a predetermined value of the maximum storable oxygen amount of the upstream side exhaust purification catalyst 20 (maximum amount of oxygen which can be stored by exhaust purification catalyst) or more. Accordingly, the diagnosis of abnormality of the downstream side air-fuel ratio sensor 41 is ended. Due to this, it is possible to suppress deterioration of the exhaust emission due to the active control continuing over a long time period.

Here, when the cumulative value of the oxygen shortage from when active control is started becomes the maximum storable oxygen amount of the upstream side exhaust purification catalyst 20 or more, the rich air-fuel ratio exhaust gas flows out from the upstream side exhaust purification catalyst 20. In this way, if the output air-fuel ratio of the downstream side air-fuel ratio sensor 41 does not become a rich judgment air-fuel ratio AFrefri or less or a lean judgment air-fuel ratio AFrefle or more regardless of rich air-fuel ratio exhaust gas flowing out, an abnormality different from a cracked element may have occurred. For this reason, in this case, in addition to suspension of active control, it may be judged that the downstream side air-fuel ratio sensor 41 is abnormal.

Figure 19:
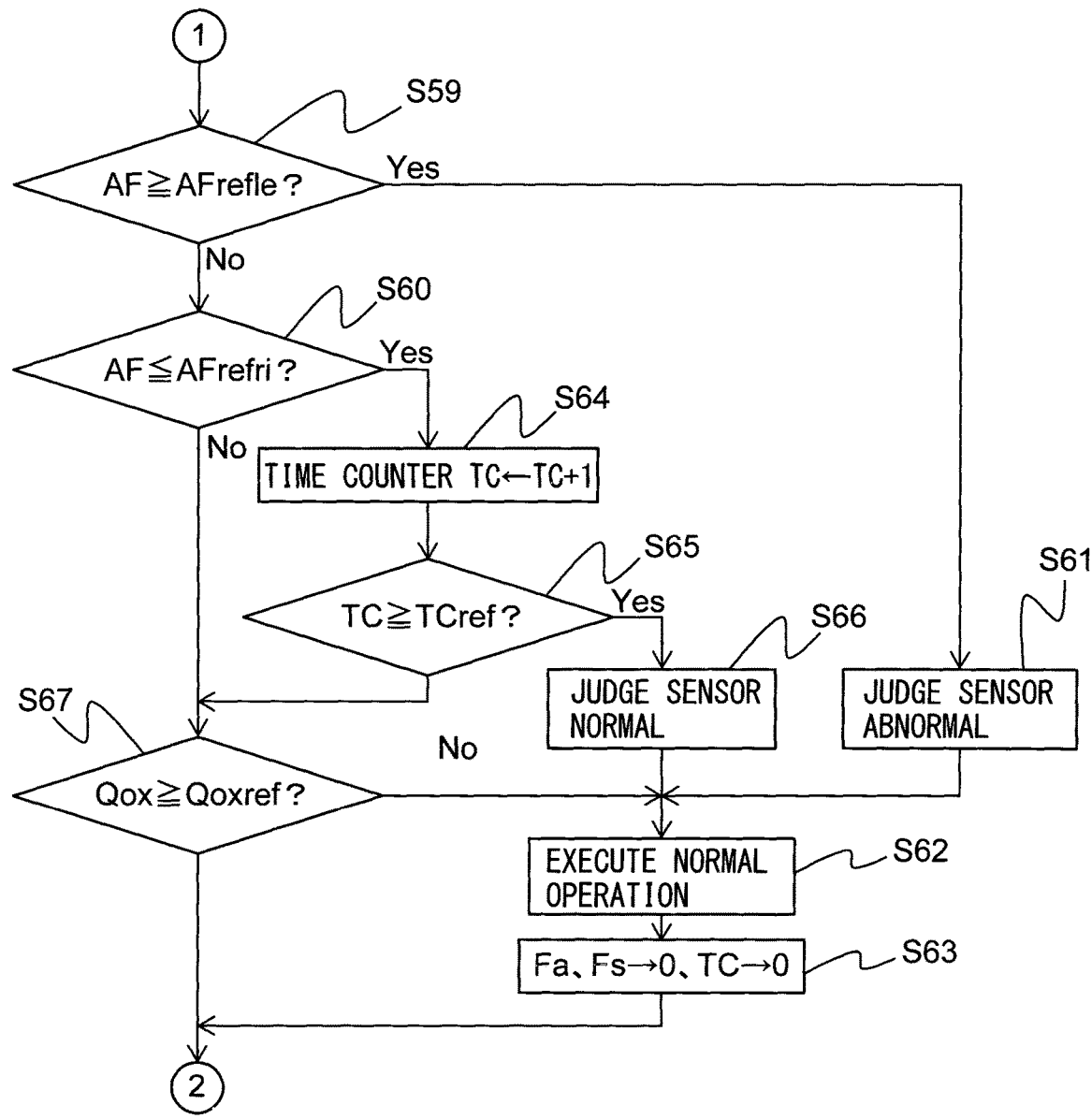
FIG. 19 is a flow chart which shows part of a control routine of abnormality diagnosis control of a downstream side air-fuel ratio sensor in a fifth embodiment.

FIG. 19 is a flow chart which shows part of the control routine of control for abnormality diagnosis of the downstream side air-fuel ratio sensor 41 in the present embodiment. The flow chart which is shown in FIG. 19 is used instead of the flow chart which is shown in FIG. 12. Therefore, in the control routine in the present embodiment, the control routines which are shown in FIG. 11 and FIG. 19 are executed.

Steps S59 to S66 of FIG. 19 are similar to steps S19 to S26 of FIG. 12, so explanations will be omitted. However, at steps S59 and S60, when it is judged that the output air-fuel ratio of the downstream side air-fuel ratio sensor 41 is an air-fuel ratio between the rich judgment reference air-fuel ratio AFrefri and the lean judgment reference air-fuel ratio AFrefle, the routine proceeds to step S67. Further, even when it is judged at step S65 that the value of the time counter TC is smaller than the judgment value TCref, the routine proceeds to step S67.

At step S67, it is judged if the cumulative value Qox of the oxygen shortage from when active control is started, which is calculated based on the output air-fuel ratio of the upstream side air-fuel ratio sensor 40 and the output of the air flow meter 39 etc., is an upper limit value Qoxref or more which is greater than the maximum storable oxygen amount. When it is judged at step S67 that the cumulative value Qox of the oxygen shortage is less than the upper limit value Qoxref, the control routine is made to end. On the other hand, when it is judged at step S67 that the cumulative value Qox of the oxygen shortage is the upper limit value Qoxref or more, the routine proceeds to step S62 where active control is made to end and normal control is started.

Note that, the above first embodiment to fifth embodiment can also be combined with each other. For example, when combining the second embodiment and the third embodiment, when the count up amount of the time counter is changed in accordance with the rich degree and the output air-fuel ratio of the downstream side air-fuel ratio sensor 41 reaches the normality judgment reference air-fuel ratio AFnor, the sensor is judged normal without regard as to the value of the time counter.

REFERENCE SIGNS LIST

1 engine body
5 combustion chamber
7 intake port
9 exhaust port
19 exhaust manifold
20 upstream side exhaust purification catalyst
24 downstream side exhaust purification catalyst
31 ECU
40 upstream side air-fuel ratio sensor
41 downstream side air-fuel ratio sensor

The invention claimed is:

1. An abnormality diagnosis system of an air-fuel ratio sensor comprising an exhaust purification catalyst provided in an exhaust passage of an internal combustion engine, an upstream side air-fuel ratio sensor provided in said exhaust passage at an upstream side of said exhaust purification catalyst in the exhaust flow direction, a downstream side air-fuel ratio sensor provided in said exhaust passage at a downstream side of said exhaust purification catalyst in the exhaust flow direction, and a diagnosis device for diagnosing abnormality of the downstream side air-fuel ratio sensor, based on outputs of these air-fuel ratio sensors, wherein upstream and downstream side air-fuel ratio measurments are used for injecting fuel into the internal combustion engine,
wherein said diagnosis device judges that said downstream side air-fuel ratio sensor is normal in the case where an output air-fuel ratio of said upstream side air-fuel ratio sensor becomes a rich air-fuel ratio which is richer than the stoichiometric air-fuel ratio and when a time counter which counts the time during which an output air-fuel ratio of said downstream side air-fuel ratio sensor becomes a rich judgment reference air-fuel ratio which is richer than a stoichiometric air-fuel ratio or less becomes a predetermined judgment value larger than zero, and judges that said downstream side air-fuel ratio sensor is abnormal due to a cracked element,
wherein said diagnosis device changes a count up amount of said time counter in accordance with a rich degree when an output air-fuel ratio of said downstream side air-fuel ratio sensor becomes said rich judgment reference air-fuel ratio or less.

2. The abnormality diagnosis system of an air-fuel ratio sensor according to claim 1 wherein said diagnosis device increases the count up amount of said time counter the larger the rich degree when the output air-fuel ratio of said downstream side air-fuel ratio sensor becomes said rich judgment reference air-fuel ratio or less.

3. The abnormality diagnosis system of an air-fuel ratio sensor according to claim 2 wherein said diagnosis device changes said judgment value so that said judgment value becomes smaller the larger the rich degree when the output air-fuel ratio of said downstream side air-fuel ratio sensor becomes said rich judgment reference air-fuel ratio or less.

4. The abnormality diagnosis system of an air-fuel ratio sensor according to claim 1 wherein said diagnosis device changes said judgment value in accordance with a rich degree when the output air-fuel ratio of said downstream side air-fuel ratio sensor becomes said rich judgment reference air-fuel ratio or less.

5. The abnormality diagnosis system of an air-fuel ratio sensor according to claim 1 wherein said diagnosis device judges that said downstream side air-fuel ratio sensor is normal when the output air-fuel ratio of said downstream side air-fuel ratio sensor becomes a normality judgment reference air-fuel ratio which is richer than said rich judgment reference air-fuel ratio or less even if said time counter is less than said judgment value.

6. The abnormality diagnosis system of an air-fuel ratio sensor according to claim 1 wherein the system further comprises an air flow meter to detect or estimate a flow rate of said downstream side exhaust gas flowing around the air-fuel ratio sensor, and
wherein said diagnosis device changes said judgment value in accordance with the flow rate which is detected or estimated by said air flow meter when the output air-fuel ratio of said downstream side air-fuel ratio sensor becomes said rich judgment reference air-fuel ratio or less.

7. The abnormality diagnosis system of an air-fuel ratio sensor according to claim 6 wherein said diagnosis device changes said judgment value so that the judgment value becomes smaller the larger the flow rate detected by said air flow meter when the output air-fuel ratio of said downstream side air-fuel ratio sensor becomes said rich judgment reference air-fuel ratio or less.

8. The abnormality diagnosis system of an air-fuel ratio sensor according to claim 1 wherein said diagnosis device judges that said downstream side air-fuel ratio sensor has become abnormal in the case where an output air-fuel ratio of said upstream side air-fuel ratio sensor is a rich air-fuel ratio which is richer than said stoichiometric air-fuel ratio and when an output air-fuel ratio of said downstream side air-fuel ratio sensor changes from an air-fuel ratio which is richer than a lean judgment reference air-fuel ratio which is leaner than the stoichiometric air-fuel ratio to said lean judgment reference air-fuel ratio or more.

9. The abnormality diagnosis system of an air-fuel ratio sensor according to claim 8 wherein an alarm lamp is lit up when it is judged that said downstream side air-fuel ratio sensor has become abnormal.

10. The abnormality diagnosis system of an air-fuel ratio sensor according to claim 1 wherein said abnormality diagnosis system can perform active control which controls the target air-fuel ratio of said exhaust gas flowing into exhaust purification catalyst to an active control rich air-fuel ratio which is richer than the stoichiometric air-fuel ratio so as to diagnose abnormality of said upstream side air-fuel ratio sensor, and
wherein said diagnosis device calculates the amount of oxygen which is insufficient when trying to make the air-fuel ratio of the exhaust gas flowing into exhaust purification catalyst the stoichiometric air-fuel ratio as the oxygen shortage, and suspends said active control when the cumulative value of oxygen shortage from when said active control is started reaches an upper limit value of the maximum storable oxygen amount of said exhaust purification catalyst or more before said downstream side air-fuel ratio sensor is either judged normal or judged abnormal.

11. The abnormality diagnosis system of an air-fuel ratio sensor according to claim 10 wherein said diagnosis device judges that said downstream side air-fuel ratio sensor has become abnormal when the cumulative value of oxygen shortage from when said active control is started reaches an upper limit value of the maximum storable oxygen amount of said exhaust purification catalyst or more before said downstream side air-fuel ratio sensor is either judged normal or judged abnormal.

12. An abnormality diagnosis system of an air-fuel ratio sensor comprising an exhaust purification catalyst provided in an exhaust passage of an internal combustion engine, an upstream side air-fuel ratio sensor provided in said exhaust passage at an upstream side of said exhaust purification catalyst in the exhaust flow direction, a downstream side air-fuel ratio sensor provided in said exhaust passage at a downstream side of said exhaust purification catalyst in the exhaust flow direction, and a diagnosis device which uses outputs of these air-fuel ratio sensors as the basis to diagnose abnormality of the downstream side air-fuel ratio sensor, in which abnormality diagnosis system of an air-fuel ratio sensor, wherein upstream and downstream side air-fuel ratio measurements are used for injecting fuel into the internal combustion engine, wherein the system further comprises an air flow meter to detect or estimate a flow rate of said downstream side exhaust gas flowing around the air-fuel ratio sensor, and wherein said diagnosis device judges that said downstream side air-fuel ratio sensor is normal in the case where an output air-fuel ratio of said upstream side air-fuel ratio sensor becomes a rich air-fuel ratio which is richer than the stoichiometric air-fuel ratio, and when an output air-fuel ratio of said downstream side air-fuel ratio sensor becomes a rich judgment reference air-fuel ratio which is richer than a stoichiometric air-fuel ratio or less, and the cumulative value which is detected or estimated by said air flow meter becomes a predetermined judgment value larger than zero, and judges that said downstream side air-fuel ratio sensor is abnormal due to a cracked element, wherein said diagnosis device changes said judgment value in accordance with a rich degree when an output air-fuel ratio of said downstream side air-fuel ratio sensor becomes a rich judgment reference air-fuel ratio or less.

13. The abnormality diagnosis system of an air-fuel ratio sensor according to claim 12 wherein said diagnosis device judges that said downstream side air-fuel ratio sensor is normal, even when said cumulative value is less than said judgment value, when an output air-fuel ratio of said downstream side air-fuel ratio sensor becomes a normality judgment reference air-fuel ratio which is richer than said rich judgment reference air-fuel ratio or less.

* * * * *